US012790265B2

(12) United States Patent
Sekiya et al.

(10) Patent No.: US 12,790,265 B2
(45) Date of Patent: Nov. 10, 2026

(54) CHEMICALLY STRENGTHENED GLASS, PRODUCTION METHOD THEREFOR, AND GLASS

(71) Applicant: AGC Inc., Tokyo (JP)

(72) Inventors: Kaname Sekiya, Tokyo (JP); Seiji Inaba, Tokyo (JP); Yusuke Fujiwara, Tokyo (JP); Yusuke Kataoka, Tokyo (JP)

(73) Assignee: AGC Inc., Tokyo (JP)

( * ) Notice: Subject to any disclaimer, the term of this patent is extended or adjusted under 35 U.S.C. 154(b) by 190 days.

(21) Appl. No.: 18/663,165

(22) Filed: May 14, 2024

(65) Prior Publication Data

US 2024/0383802 A1 Nov. 21, 2024

(30) Foreign Application Priority Data

May 19, 2023 (JP) ................................ 2023-083281

(51) Int. Cl.
*C03C 21/00* (2006.01)
*C03C 3/095* (2006.01)
*C03C 3/097* (2006.01)

(52) U.S. Cl.
CPC ............ *C03C 21/002* (2013.01); *C03C 3/095* (2013.01); *C03C 3/097* (2013.01)

(58) Field of Classification Search
USPC ........................................................ 428/213
See application file for complete search history.

(56) References Cited

U.S. PATENT DOCUMENTS 9,359,251 B2 6/2016 Bookbinder et al.
10,150,698 B2 12/2018 Amin et al.
10,730,791 B2 8/2020 Hu et al.
2014/0356576 A1* 12/2014 Dejneka ................. C03C 3/093 428/141
2015/0239776 A1* 8/2015 Amin ................... G06F 1/1637 428/220
2020/0039876 A1 2/2020 Imakita et al.
2020/0325066 A1 10/2020 Murayama et al.
2022/0135466 A1 5/2022 Maeda et al.
2022/0204400 A1 6/2022 Imakita et al.
2023/0119617 A1 4/2023 Murayama et al.
2023/0278916 A1 9/2023 Imakita et al.

FOREIGN PATENT DOCUMENTS

WO WO 2018/186402 A1 10/2018
WO WO-2019054342 A1 * 3/2019 ............ C03C 21/00
WO WO 2021/010376 A1 1/2021

* cited by examiner

*Primary Examiner* — Ula C Ruddock
(74) *Attorney, Agent, or Firm* — Oblon, McClelland, Maier & Neustadt, L.L.P.

(57) ABSTRACT

The present invention relates to a chemically strengthened glass having a sheet thickness t (mm), a compressive stress layer depth DOC of 180×t (μm) or more, $CS_{30-50}$ which is a compressive stress integrated value at a depth of 30 μm to 50 μm from a surface of the chemically strengthened glass of 12000 Pa·m or less, and $CS_{90}$ which is a compressive stress value at a depth of 90 μm from the surface of 175×t−88 (MPa) or more.

9 Claims, 6 Drawing Sheets

CHEMICALLY STRENGTHENED GLASS, PRODUCTION METHOD THEREFOR, AND GLASS

CROSS-REFERENCE TO RELATED APPLICATIONS

This application is based on and claims priority from Japanese Patent Application No. 2023-083281 filed on May 19, 2023, the entire content of which is incorporated herein by reference.

TECHNICAL FIELD

The present invention relates to a chemically strengthened glass, a production method therefor, and a glass.

BACKGROUND ART

A chemically strengthened glass is used for a cover glass of electronic devices such as a computer, a smartphone, and a tablet. The chemically strengthened glass is obtained by forming a compressive stress layer on a surface portion of a glass by an ion exchange treatment in which a glass is brought into contact with a molten salt composition such as sodium nitrate and potassium nitrate. In the ion exchange treatment, ion exchange occurs between alkali metal ions contained in the glass and alkali metal ions having a larger ion radius contained in the molten salt composition, and the compressive stress layer is formed on the surface portion of the glass.

The strength of the chemically strengthened glass depends on a stress profile represented by a compressive stress value (hereinafter also abbreviated as CS) with the depth from the glass surface as a variable. In the case of performing the ion exchange treatment in two or more stages, as the compressive stress layer, a "surface layer compressive stress layer" is formed mainly by introducing potassium ions or the like into the glass, and a "deep layer compressive stress layer" is mainly formed by introducing sodium ions or the like into the glass.

On the other hand, when the compressive stress layer is formed on the surface portion of the glass, a tensile stress (hereinafter also abbreviated as CT) necessarily occurs in a center portion of the glass according to a total compressive stress. When the CT value is too large, the glass article cracks violently and is scattered into fragments when fractured. When the CT value is greater than a threshold value (hereinafter also abbreviated as a CT limit), the glass may self-destruct, resulting in an explosive increase in the number of fragments when receiving damage. The CT limit is a value specific to the glass composition.

Therefore, in a chemically strengthened glass, while the surface compressive stress is set to be large and the compressive stress layer is formed to a deeper portion, the total surface compressive stress is designed such that not exceeding the CT limit. For example, Patent Literature 1 discloses a chemically strengthened glass in which the CT is controlled to fall within a specific range. In addition, Patent Literature 2 discloses a chemically strengthened glass having a CS and a DOC in specific range. Patent Literature 3 discloses a chemically strengthened glass having a total compressive stress equal to or less than a certain value.

As one of indices for evaluating the strength of a glass-based material for use in smartphones, there is a sandpaper set drop strength test. The sandpaper set drop strength test is a test of dropping, onto #60 to #200 sandpaper, a sample obtained by laminating a smartphone casing or a mock plate simulating a smartphone and a glass-based material, and using a drop height at which a crack occurs (hereinafter also abbreviated as a "crack height", "set drop strength") as the index of the strength.

CITATION LIST

Patent Literature

Patent Literature 1: U.S. Pat. No. 9,359,251B
Patent Literature 2: U.S. Ser. No. 10/150,698B
Patent Literature 3: WO 2018/186402

SUMMARY OF INVENTION

When $CS_{90}$, which is a compressive stress value at a depth of 90 μm, is increased, for example, the stress profile has a large compressive stress near a depth of 90 μm, and it is possible to prevent fracture caused by collision with a relatively large protrusion. $CS_{90}$ shows a high correlation with the set drop strength, as shown in FIG. 1. Therefore, in order to develop a glass having higher set drop strength, it is required to increase the $CS_{90}$ value.

For example, U.S. Ser. No. 10/730,791B discloses that a deep stress can be increased by diffusing Na ions as deeply as possible to near the sheet thickness center to increase the CT.

However, as described above, when the CT is increased, the glass may self-destruct, resulting in an explosive increase in the number of fragments when receiving damage, so that there is a restriction on the CT limit. Therefore, the set drop strength is insufficient in the related art, and a chemically strengthened glass having a larger $CS_{90}$ is required in order to further improve the set drop strength.

Therefore, one object of the present invention is to provide a chemically strengthened glass, a production method therefor, and a glass in which the $CS_{90}$ is maximized and excellent set drop strength is achieved.

In a chemically strengthened glass production process, in the case of performing the ion exchange treatment in two or more stages, in a first stage of ion exchange treatment (hereinafter also abbreviated as a "first ion exchange"), when a glass is brought into contact with a first molten salt composition to cause ion exchange, exchange occurs between a "first alkali metal ion" in the glass and a "second alkali metal ion having a ion radius larger than that of the first alkali metal ion" in the first molten salt composition, and the second alkali metal ion in the first molten salt composition is introduced into the glass. Further, in a second stage of ion exchange treatment (hereinafter also abbreviated as a "second ion exchange") after the first ion exchange treatment, the glass for chemical strengthening that has undergone the first ion exchange treatment is brought into contact with a second molten salt composition to undergo ion exchange.

In the second ion exchange treatment and thereafter, at the same time with exchange of an ion in the second molten salt composition (for example, a third alkali metal ion having a ion radius larger than that of the second alkali metal ion) with the ion in the glass (for example, the second alkali metal ion), the second alkali metal ion introduced into the glass from the first molten salt composition during the first ion exchange treatment is diffused in the glass.

The inventors of the present invention have found that when a composition containing a first alkali metal ion (for example, a Li ion) is used as a first molten salt composition in a first ion exchange treatment, and ion exchange (hereinafter, also abbreviated as reverse ion exchange) between a second alkali metal ion (for example, a Na ion) in the glass and the first alkali metal ion in the first molten salt composition is performed in parallel with the above exchange of the first alkali metal ion in the glass with the second alkali metal ion in the first molten salt composition, the $CS_{90}$ is maximized. The present invention has been completed based on such a finding.

The present invention provides a chemically strengthened glass, production method therefor, and a glass having the following configurations.

1. A chemically strengthened glass having a sheet thickness t (mm), a compressive stress layer depth DOC of 180×t (μm) or more, $CS_{30-50}$ which is a compressive stress integrated value at a depth of 30 μm to 50 μm from a surface of the chemically strengthened glass of 6000 Pa·m or less, and $CS_{90}$ which is a compressive stress value at a depth of 90 μm from the surface of 175×t−88 (MPa) or more.

2. The chemically strengthened glass according to 1, having a Young's modulus of 80 GPa or more.

3. The chemically strengthened glass according to 1 or 2, in which in a profile of $CS_x$ [MPa] which is a stress value at a depth of x [μm] from the surface of the chemically strengthened glass as measured with a scattered light photoelastic stress meter, a second-order differential value $CS_x''$ of the stress value $CS_x$ satisfies the following expression in a range of $CS_x \geq 0$:

$$-0.03 \leq CS_x'' \leq 0.013.$$

4. The chemically strengthened glass according to any one of 1 to 3, having a surface compressive stress value FSM-CS, of 800 MPa or more.

5. A chemically strengthened glass having a surface resistivity of 10 log Ω/sq or less, and a Young's modulus of 80 GPa or more.

6. A chemically strengthened glass having a value obtained by dividing an $Na_2O$ concentration at a depth of 30 μm from a surface of the chemically strengthened glass by an $Na_2O$ concentration at a depth of 90 μm from the surface of 1.30 or less.

7. The chemically strengthened glass according to 6, having a value obtained by dividing an $Na_2O$ concentration at a depth of 50 μm from the surface by an $Na_2O$ concentration at a sheet thickness center portion of the chemically strengthened glass of 2 or more and 4 or less.

8. The chemically strengthened glass according to 6 or 7, having a value obtained by dividing the $Na_2O$ concentration at the depth of 90 μm from the surface by the $Na_2O$ concentration at the sheet thickness center portion of 2.4 or more.

9. The chemically strengthened glass according to any one of 1 to 8, having a base composition including, in mol % in terms of oxide:

55% to 75% of $SiO_2$;

3% to 15% of $Li_2O$; and

8% to 25% of $Al_2O_3$.

10. A chemically strengthened glass production method, the method including at least:

a first ion exchange treatment of bringing a glass for chemical strengthening into contact with a first molten salt composition; and a second ion exchange treatment of bringing the glass for chemical strengthening into contact with a second molten salt composition after the first ion exchange treatment, in which in the first ion exchange treatment, the glass for chemical strengthening is brought into contact with the first molten salt composition at 350° C. to 450° C. for 150 minutes or longer, and the glass for chemical strengthening includes, in mol % in terms of oxide:

55% to 75% of $SiO_2$;

3% to 15% of $Li_2O$; and

8% to 25% of $Al_2O_3$.

11. The chemically strengthened glass production method according to 10, in which the first molten salt composition includes 0.01 mass % to 1 mass % of a lithium ion.

12. A chemically strengthened glass production method, the method including at least:

a first ion exchange treatment of bringing a glass for chemical strengthening into contact with a first molten salt composition; and a second ion exchange treatment of bringing the glass for chemical strengthening into contact with a second molten salt composition after the first ion exchange treatment, in which the first ion exchange treatment is performed at 350° C. to 450° C. for 150 minutes or longer, and the first molten salt composition includes a lithium ion, and the glass for chemical strengthening includes, in mol % in terms of oxide:

55% to 75% of $SiO_2$;

3% to 15% of $Li_2O$; and

8% to 25% of $Al_2O_3$.

13. The chemically strengthened glass production method according to 12, in which the second molten salt composition includes 0 mass % to 5 mass % of lithium nitrate.

14 The chemically strengthened glass production method according to 12 or 13, the method further including:

a third ion exchange treatment of bringing the glass for chemical strengthening into contact with a third molten salt composition after the second ion exchange treatment, in which the third molten salt composition includes 98 mass % or more of potassium nitrate.

15. The chemically strengthened glass production method according to any one of 11 to 13, in which the glass for chemical strengthening is made to have CTave less than CTA by the second ion exchange treatment or a subsequent ion exchange treatment, provided that the CTA is determined according to the following equation (1), and the CTave is determined according to the following equation (2).

[Math. 1]

$$CTA = 317.93 \times K1c/\sqrt{t} + 228.5 \times t - 398 \qquad \text{Equation (1)}$$

t: sheet thickness (μm)

K1c: fracture toughness value (MPa·$m^{1/2}$)

$$CTave = ICT/LCT \qquad \text{Equation (2)}$$

ICT: tensile stress integrated value (Pa·m)

LCT: sheet thickness direction length (μm) of tensile stress region.

16. A glass including, in mol % in terms of oxide:

55% to 75% of $SiO_2$;

8% to 25% of $Al_2O_3$;

3% to 15% of $Li_2O$;

1% to 5% of $Na_2O$;

0% to 3% of $K_2O$;

0% to 10% of MgO;

0% to 10% of CaO;

0% to 5% of SrO;

0% to 5% of ZnO;

0% to 3% of $TiO_2$;

0% to 3% of $ZrO_2$;

0% to 1% of $SnO_2$;

0% to 1% of $P_2O_5$;

0% to 10% of $B_2O_3$;

0% to 3% of $Y_2O_3$; and

0% to 0.1% of $Fe_2O_3$, in which $Li_2O/[Li_2O+Na_2O+K_2O]$, which is a ratio of a content of $Li_2O$ to a total content of $Li_2O$, $Na_2O$, and $K_2O$, is 0.5 to 0.9, $Li_2O/Na_2O$, which is a ratio of the content of $Li_2O$ to a content of $Na_2O$, is 1.5 to 10, and a Young's modulus is 80 GPa or more.

17. The glass according to 16, in which $B_2O_3/P_2O_5$, which is a ratio of a content of $B_2O_3$ to a content of $P_2O_5$, is 2.5 to 500.

18. The glass according to 16 or 17, in which in a case where a compressive stress layer is formed by an ion exchange treatment at 380° C. for 4 hours by using a molten salt including sodium nitrate, $CS_{30}$ which is a compressive stress value at a depth of 30 μm from a surface of the compressive stress layer is 150 MPa or more.

A chemically strengthened glass according to a first embodiment of the present invention has stress properties in a specific range. According to the chemically strengthened glass of the present invention, particularly, when $CS_{30-50}$ which is the compressive stress integrated value at a depth of 30 μm to 50 μm from the surface is set to 6000 Pa·m or less, the surface layer compressive stress can be reduced, the internal tensile stress can be reduced, and the $CS_{90}$ is a large deep compressive stress of 175xt−88 (MPa) or more, with the sheet thickness being t (mm). Accordingly, it is possible to achieve excellent set drop strength that cannot be achieved in the related art while avoiding the CT limit.

A chemically strengthened glass according to a second embodiment of the present invention has a surface resistivity and a Young's modulus in a specific range. Accordingly, peeling-off of a coating can be prevented, and a larger deep layer compressive stress than that in the related art can be achieved while maintaining a large surface compressive stress.

A chemically strengthened glass according to a third embodiment of the present invention has a value obtained by dividing an $Na_2O$ concentration at a depth of 30 μm from a surface by an $Na_2O$ concentration at a depth of 90 μm from the surface of 1.30 or less. In a general chemically strengthened glass, the $Na_2O$ concentration increases from the center portion of the glass to the glass surface. When the above value is 1.30 or less, a sodium concentration profile in the glass is flat, the surface layer compressive stress can be reduced, the internal tensile stress can be reduced, and a large deep layer compressive stress can be achieved. In addition, as compared with the related-art, an increase in surface resistivity can be effectively prevented and the peeling-off of the coating can be prevented.

A chemically strengthened glass production method according to a fourth embodiment of the present invention includes at least a first ion exchange treatment of bringing a glass for chemical strengthening having a composition in a specific range into contact with a first molten salt composition at 350° C. to 450° C. for 150 minutes or longer, and a second ion exchange treatment of bringing the glass for chemical strengthening into contact with a second molten salt composition after the first ion exchange treatment. Accordingly, the $CS_{90}$ can be maximized in the first ion exchange treatment, and it is possible to produce a chemically strengthened glass that exhibits excellent set drop strength that cannot be achieved in the related art.

A chemically strengthened glass production method according to a fifth embodiment of the present invention includes at least a first ion exchange treatment of bringing a glass for chemical strengthening having a composition in a specific range into contact with a first molten salt composition containing a lithium ion at 350° C. to 450° C. for 150 minutes or longer, and a second ion exchange treatment of bringing the glass for chemical strengthening into contact with a second molten salt composition after the first ion exchange treatment.

Accordingly, in the first ion exchange treatment, processes such as structural relaxation due to heat and reverse ion exchange in the surface layer can reduce the surface layer compressive stress and the internal tensile stress, the $CS_{90}$ can be maximized while avoiding the CT limit, and it is possible to produce a chemically strengthened glass that exhibits excellent set drop strength that cannot be achieved in the related art.

A glass according to a sixth embodiment of the present invention has a composition and a Young's modulus in a specific range, and is chemically strengthened, whereby it is possible to obtain a chemically strengthened glass that maintains a large surface compressive stress and has a larger deep layer compressive stress than that of a glass in the related art.

DESCRIPTION OF EMBODIMENTS

Figure 1:
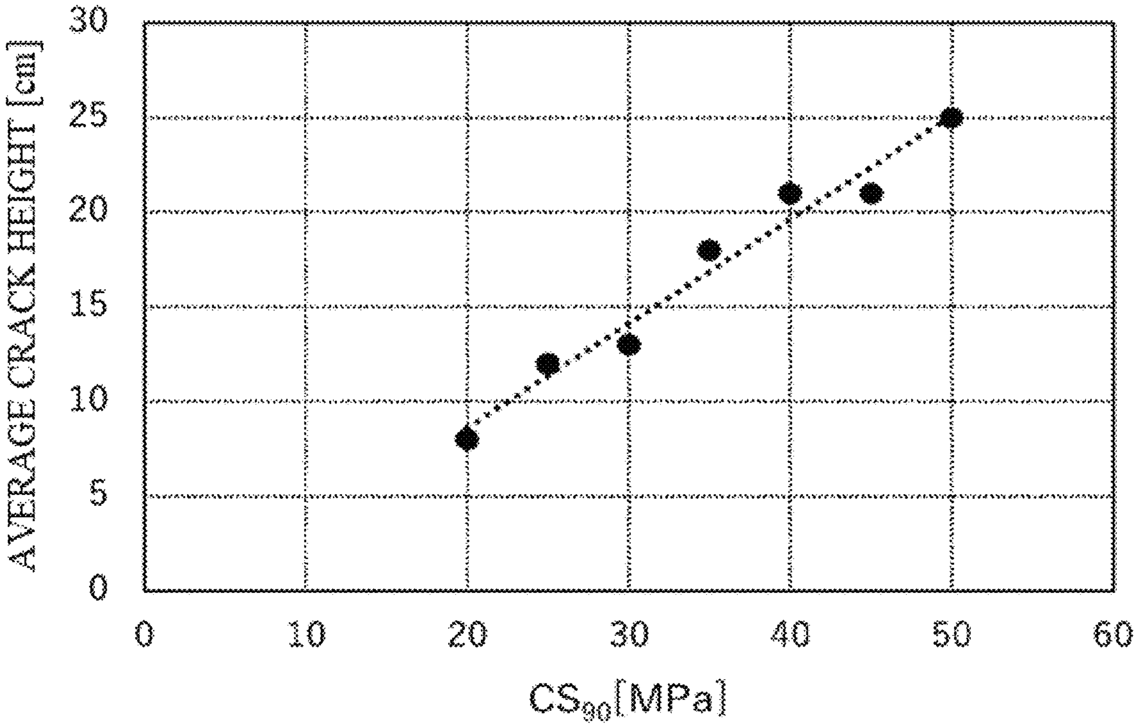
FIG. 1 is a diagram showing a correlation between $CS_{90}$ and #80 sandpaper set drop strength.

In the present description, a "chemically strengthened glass" refers to a glass after a chemical strengthening treatment, and a "glass for chemical strengthening" refers to a glass before a chemical strengthening treatment.

In the present description, a glass composition is expressed in mol % in terms of oxide unless otherwise specified, and mol % is simply expressed as "%".

In the present description, “not substantially contained” means that a component has a content equal to or less than an impurity level contained in raw materials and the like, that is, the component is not intentionally added. Specifically, the content is, for example, less than 0.1%.

In the present description, a “stress profile” represents a compressive stress value with the depth from a glass surface as a variable. In the stress profile, a tensile stress may be expressed as a negative compressive stress. In the present description, the tensile stress is expressed as an absolute value.

A “compressive stress value (CS)” can be measured by slicing a cross section of a glass and analyzing the sliced sample with a birefringent imaging system. A birefringent imaging system stress meter is a device for measuring a magnitude of retardation caused by the stress by using a polarization microscope, a liquid crystal compensator, or the like, and for example, there is a birefringent imaging system Abrio-IM manufactured by CRi.

In addition, the measurement may be performed using scattered light photoelasticity. In this method, light is incident from the glass surface, and polarization of scattered light thereof is analyzed to measure the CS. For example, a scattered light photoelastic stress meter SLP-2000 manufactured by Orihara Industrial Co., Ltd. is used as a stress measurement instrument using the scattered light photoelasticity.

In the present description, a “compressive stress layer depth (DOC)” is a depth at which the compressive stress value is zero. In the following, the surface compressive stress value measured with a scattered light photoelastic stress meter may be referred to as $CS_0$, the compressive stress value at a depth of 50 μm from the surface may be referred to as $CS_{50}$, and the compressive stress value at a depth of 90 μm from the surface may be referred to as $CS_{90}$. In addition, an “internal tensile stress (CT)” refers to the absolute value of a tensile stress value at a depth of ½ of a sheet thickness t, and is equivalent to “$CS_{t/2}$” in the present description.

In the present description, a “Young's modulus” is measured by an ultrasonic method.

In the present description, a “fracture toughness value K1c” is a value according to the IF method defined in JIS R1607:2015. The value of K1c is a value dependent on the glass composition and can be adjusted according to the glass composition.

In the present description, a “surface resistivity” is measured by using a contact conductivity meter. The surface resistivity has a positive correlation with a volume resistivity.

<Set Drop Strength>

In the present description, “#80 drop strength” is measured by the following method.

A glass sample of 120 mm×60 mm×0.7 mm is fitted into a structure whose mass and rigidity are adjusted to a size of a general smartphone currently used, to prepare a pseudo-smartphone, and is freely dropped on #80 SiC sandpaper. As a drop height, in the case where the glass sample does not crack after dropping from a height of 5 cm, an operation of increasing the height by 5 cm and performing dropping again until a crack occurs in the glass is repeated, and the height at the first crack is defined as the drop height. The result of the average crack height when a drop test is performed on 20 sheets for each glass sample is defined as the “#80 sandpaper average set drop strength”.

<4PB Strength (4-Point Bending Strength)>

In the present description, 4PB strength is measured by the following method.

A chemically strengthened glass is processed into a strip shape of 120 mm×60 mm, and a 4-point bending test is performed under the conditions including a distance between external fulcrums of a support of 30 mm, a distance between internal fulcrums of the support of 10 mm, and a crosshead speed of 5.0 mm/min to measure the 4-point bending strength. The number of the test pieces is 10. Note that, the chemically strengthened glass is processed into a strip shape, and then subjected to automatic chamfering (C-chamfering) by using a grindstone having a grit count of 1000 (manufactured by Tokyo Diamond Tools Mfg. Co., Ltd.), and an end surface thereof was mirror-finished by using a nylon brush having a diameter of 0.1 mm and SHOROX NZ abrasive grains (manufactured by Showa Denko Co., Ltd.) to obtain a glass of 120×60×0.7 mm in thickness for measurement.

<Na Concentration>

In the present description, an $Na_2O$ concentration at a depth of x [μm] is obtained by measuring a concentration in a cross section in the sheet thickness direction by using an electron probe micro analyzer (EPMA). Specifically, the measurement by using an EPMA is performed as follows, for example.

First, a glass sample is embedded with an epoxy resin and mechanically polished in a direction perpendicular to a first main surface and a second main surface opposite to the first main surface to prepare a cross section sample. A C-coat is applied to the polished cross section, and measurement is performed by using an EPMA (JXA-8500F manufactured by JEOL Ltd.). A line profile of an X-ray intensity of Na is acquired at an interval of 1 μm at an acceleration voltage of 15 kV, a probe current of 30 nA, and an integration time of 1000 msec./point. Regarding the obtained $Na_2O$ concentration profile, an average count at a sheet thickness center portion (0.5×t)±25 μm (the sheet thickness is t μm) is used as a bulk composition, and the count in the entire sheet thickness is calculated by proportionally converting the count into mol %.

<Stress Measurement Method>

In recent years, a glass that has undergone two stages of chemical strengthening by exchanging lithium ions inside the glass with sodium ions (Li—Na exchange), and then exchanging the sodium ions inside the glass with potassium ions (Na—K exchange) on a surface layer portion of the glass has become mainstream for a cover glass of a smartphone and the like.

In order to acquire a stress profile of such a two-stage chemically strengthened glass in a non-destructive manner, for example, a scattered light photoelastic stress meter (hereinafter also abbreviated as an SLP), a film stress measurement (hereinafter also abbreviated as an FSM), or the like may be used in combination.

In a method using the scattered light photoelastic stress meter (SLP), a compressive stress derived from the Li—Na exchange can be measured inside the glass at a depth of several tens of m or more from a glass surface layer. On the other hand, in a method using the film stress measurement (FSM), the compressive stress derived from the Na—K exchange can be measured in a surface layer portion of the glass, which is at a depth of several tens of μm or less from the glass surface (for example, WO 2018/056121 and WO 2017/115811). Therefore, as a stress profile in the glass surface layer and inside of the two-stage chemically strengthened glass, a combination of SLP information and FSM information is sometimes used.

In the present invention, the stress profile measured by the scattered light photoelastic stress meter (SLP) is mainly used. Note that, in the present description, the compressive stress value CS, the tensile stress CT, the compressive stress layer depth DOC, or the like means a value in the SLP stress profile.

The scattered light photoelastic stress meter is a stress measuring device including: a polarization phase difference variable member that changes a polarization phase difference of laser light by one wavelength or more with respect to a wavelength of the laser light; an imaging element that acquires a plurality of images by imaging, a plurality of times at predetermined time intervals, scattered light emitted when the laser light having the variable polarization phase difference is incident on a strengthened glass; and a calculation unit that measures a periodic luminance change of the scattered light using the plurality of images, calculates a phase change of the luminance change, and calculates a stress distribution in a depth direction from a surface of the strengthened glass based on the phase change.

A method for measuring the stress profile by using the scattered light photoelastic stress meter includes a method described in WO 2018/056121. Examples of the scattered light photoelastic stress meter include SLP-1000 and SLP-2000 manufactured by Orihara Industrial Co., Ltd. A combination of attached software SlpIV_up3 (Ver. 2019.01.10.001) with these scattered light photoelastic stress meters enables highly accurate stress measurement.

<CTA>

The CT limit corresponds to a CTA determined according to the following equation (1), and is a value determined based on the composition of the glass for chemical strengthening.

[Math. 2]

$$CTA = 317.93 \times K1c/\sqrt{t} + 228.5 \times t - 398 \quad \text{Equation (1)}$$

t: sheet thickness (mm)

K1c: fracture toughness value (MPa·m$^{1/2}$)

<CTave>

In the present description, "CTave" is determined according to the following equation (2). The CTave is a value corresponding to a tensile stress average value, and is a value obtained by integrating stress values in a tensile stress region in the sheet thickness direction in the tensile stress region and dividing the integrated value by a length of the tensile stress region.

$$CTave = ICT/LCT \quad \text{Equation (2)}$$

ICT: tensile stress integrated value (Pa·m)

LCT: sheet thickness direction length (μm) of tensile stress region

Chemically Strengthened Glass: First to Third Embodiments

Hereinafter, a first embodiment to a third embodiment will be described as embodiments of a chemically strengthened glass according to the present invention. In the present description, the chemically strengthened glass according to the present invention, including the first embodiment to the third embodiment, is also abbreviated as "the present chemically strengthened glass".

Chemically Strengthened Glass of First Embodiment

A chemically strengthened glass according to the first embodiment has a sheet thickness t (mm), in which a compressive stress layer depth DOC is 180×t (μm) or more, $CS_{30-50}$ which is a compressive stress integrated value at a depth of 30 μm to 50 μm from a surface is 6000 Pa·m or less, and $CS_{90}$ which is a compressive stress value at a depth of 90 μm from the surface is 175×t−88 (MPa) or more.

In the chemically strengthened glass according to the first embodiment, the compressive stress layer depth DOC is 180×t (μm) or more, preferably 182.5×t (μm) or more, more preferably 185×t (μm) or more, still more preferably 187.5×t (μm) or more, and particularly preferably 190×t (μm) or more. When the DOC is 190×t (μm) or more and a compressive stress layer is formed to a deep portion of the glass, the glass is less likely to crack even when receiving large impact.

The DOC is not particularly limited in upper limit, and is, for example, 300×t (μm) or less, preferably 280×t (μm) or less, more preferably 260×t (μm) or less, and particularly preferably 250×t (μm) or less, in order to keep a small cumulative value of the compressive stress value.

In the chemically strengthened glass according to the first embodiment, the $CS_{30-50}$ which is the compressive stress integrated value at a depth of 30 μm to 50 μm from the surface is 6000 Pa·m or less. When the $CS_{30-50}$ is 6000 Pa·m or less, the surface layer compressive stress can be recued, and the internal tensile stress can be reduced. The $CS_{30-50}$ is not particularly limited in lower limit, and is generally 3750 Pa·m or more, preferably 4000 Pa·m or more, more preferably 4125 Pa·m or more, and still more preferably 4250 Pa·m or more.

In the chemically strengthened glass according to the first embodiment, $CS_{90}$ which is the compressive stress value at a depth of 90 μm from the surface is 175×t−88 (MPa) or more, preferably 175×t−86 (MPa) or more, more preferably 175×t−83 (MPa) or more, still more preferably 175×t−81 (MPa) or more, and particularly preferably 175×t−78 (MPa) or more. When the $CS_{90}$ is 175×t−88 (MPa) or more, the set drop strength (for example, #80 sandpaper set drop strength) can be improved as compared with that in the related art. The $CS_{90}$ is not particularly limited in upper limit, and is, for example, 175×t−40 (MPa) or less, preferably 175×t−42.5 (MPa) or less, more preferably 175×t−45 (MPa) or less, and particularly preferably 175×t−50 (MPa) or less, in order to keep a small cumulative value of the compressive stress value.

In the chemically strengthened glass according to the first embodiment, the Young's modulus is preferably 80 GPa or more, more preferably 82 GPa or more, still more preferably 84 GPa or more, and particularly preferably 85 GPa or more. When the Young's modulus is 80 GPa or more, a larger CTA can be achieved and the deep layer stress can be increased.

The Young's modulus has a correlation with the diffusivity of sodium ions, and the higher the Young's modulus, the more difficult it is for Na ions to diffuse. When the Young's modulus is 80 GPa or more, the Na ions are difficult to diffuse, making it easy to introduce a large surface layer compressive stress by ion exchange, and even when the surface layer compressive stress is reduced by reverse ion exchange, the deep layer compressive stress can be maintained larger while maintaining the large surface compressive stress. The Young's modulus is not particularly limited in upper limit, and is generally 100 GPa or less, preferably 95 GPa or less, and more preferably 90 GPa or less, from the viewpoint of a bending process.

In the chemically strengthened glass according to the first embodiment, in a profile of a stress value $CS_x$ [MPa] at a depth x [μm] from the glass surface as measured with a scattered light photoelastic stress meter as described above, a second-order differential value $CS_x''$ of the stress value $CS_x$ preferably satisfies an expression of $-0.03 \le CS_x'' \le 0.013$ in a range of $CS_x \ge 0$. Here, the $CS_x''$ is more preferably 0.010 or less, still more preferably 0.008 or less, and particularly preferably 0.006 or less. In this case, the profile has a more linear shape, and the stress value $CS_{90}$ at a depth of 90 μm can be effectively increased. In addition, the $CS_x''$ is more preferably −0.028 or more, and still more preferably −0.024 or more.

A first-order differential value $CS_x'$ of the stress value $CS_x$ in a range of $CS_x \ge 0$ is preferably −3.0 or more, more preferably −2.8 or more, and still more preferably −2.6 or more. When the first-order differential value $CS_x'$ is within the above range, a change in $CS_x'$ becomes small, and the profile of the stress value $CS_x$ has a linear shape. In addition, for the same $CS_0$, having a large $CS_x$ makes it possible to obtain an effect of maintaining a large $CS_{90}$. The $CS_x'$ is typically −0.8 or less.

Note that, as a method for differentiating a stress profile, in the present invention, as represented by the following equations, in a $CS_x$ profile, a rate of change in $CS_x$ when an amount of change in x is 0.5 μm is used as the value $CS_x'$, and a rate of change in $CS_x$ when the amount of change in x is 0.5 μm is used as the value $CS_x'$.

$$CS_x' = (CS_{x+0.5} - CS_x)/0.5$$

$$CS_x'' = (CS_{x+0.5}' - CS_x')/0.5$$

In the chemically strengthened glass according to the first embodiment, it is preferable that a surface compressive stress value FSM-$CS_0$ as measured with an FSM is 800 MPa or more since the set drop strength is further improved and cracks due to deformation such as bending are less likely to occur. The FSM-$CS_0$ is more preferably 900 MPa or more, still more preferably 950 MPa or more, and particularly preferably 1000 MPa or more. The upper limit of the FSM-$CS_0$ is not particularly limited, and is generally preferably 1500 MPa or less from the viewpoint of keeping a small cumulative value of the compressive stress value.

FSM-$CS_0$: compressive stress value at depth of 0 μm as measured with FSM $CS_x$: compressive stress value at depth x [μm] as measured with SLP In the chemically strengthened glass according to the first embodiment, a surface layer compressive stress layer depth DOL-tail is preferably 2.8 μm or more, more preferably 2.9 μm or more, still more preferably 3.0 μm or more, and particularly preferably 3.3 μm or more. When the DOL-tail is 2.8 μm or more, the 4-point bending strength is improved. The DOL-tail is not particularly limited in upper limit, and is preferably, for example, 8.0 μm or less, and more preferably 7.0 μm or less, from the viewpoint of a balance with a deep layer stress. In the present description, the surface layer compressive stress layer depth DOL-tail refers to a maximum depth of the compressive stress layer that can be measured by an FSM.

In the chemically strengthened glass according to the first embodiment, a surface resistivity is preferably 10 log Ω/sq or less, more preferably 9.5 log Ω/sq or less, still more preferably 9.0 log Ω/sq or less, and particularly preferably 8.5 log Ω/sq or less. When the surface resistivity is 10 log Ω/sq or less, peeling-off of a coating can be prevented. The lower limit of the surface resistivity is not particularly limited, and is generally preferably 7.0 log Ω/sq or more.

In the chemically strengthened glass according to the first embodiment, the sheet thickness t (mm) is preferably 0.8 mm or less, more preferably 0.7 mm or less, still more preferably 0.65 mm or less, and particularly preferably 0.6 mm or less, from the viewpoint of improving the strength. The smaller the t is, the more the strength is improved by the present invention. The t is typically 0.02 mm or more.

The stress properties and the ion profile in the chemically strengthened glass of the first embodiment can be adjusted according to the base composition thereof and the conditions in the ion exchange treatment. The glass composition of the chemically strengthened glass of the first embodiment will be described later in the section <<Base Composition of Chemically Strengthened Glass>>.

Chemically Strengthened Glass of Second Embodiment

A chemically strengthened glass according to the second embodiment has a surface resistivity of 10 log Ω/sq or less and a Young's modulus of 80 GPa or more.

In the chemically strengthened glass according to the second embodiment, the surface resistivity is 10 log Ω/sq or less, preferably 9.5 log Ω/sq or less, more preferably 9.0 log Ω/sq or less, still more preferably 8.5 log Ω/sq or less, and particularly preferably 8.0 log Ω/sq or less.

The coating tends to peel off more easily as the surface resistivity of the chemically strengthened glass increases (WO 2021/010376). In addition, the content ratio of alkali metal oxides influences the surface resistivity (WO 2021/010376). For example, a glass containing three types of alkali metal oxides of $Li_2O$, $Na_2O$, and $K_2O$ has a larger surface resistivity due to a so-called mixed alkali effect, as compared with a glass containing only one or two types of alkali metal oxides even with the same amount of the alkali metal oxides.

Therefore, when the glass is chemically strengthened through two or more stages of ion exchange, as a result, a chemically strengthened glass containing three types of $Li_2O$, $Na_2O$, and $K_2O$ is obtained, and the peeling-off of the coating tends to occur. On the other hand, when a glass composition before strengthening and chemical strengthening treatment conditions are adjusted in order to prevent the peeling-off of the coating after chemical strengthening, there is a problem that it is difficult to obtain sufficient strength by the chemical strengthening.

In the chemically strengthened glass according to the second embodiment, when the surface resistivity is 10 log Ω/sq or less, electrification between the coating surface and the glass surface can be prevented, and the peeling-off of the coating can be prevented. The lower limit of the surface resistivity is not particularly limited, and is generally preferably 7.0 log Ω/sq or more.

In the chemically strengthened glass according to the second embodiment, the Young's modulus is 80 GPa or more, preferably 82 GPa or more, more preferably 84 GPa or more, still more preferably 85 GPa or more, and particularly preferably 85.5 GPa or more. When the Young's modulus is 80 GPa or more, the Na ions are difficult to diffuse, making it easy to introduce a large surface layer compressive stress by ion exchange, and even when the surface layer compressive stress is reduced by reverse ion exchange, the deep layer compressive stress can be maintained larger while maintaining the large surface compressive stress.

It is preferable that the chemically strengthened glass of the second embodiment has the same properties as the chemically strengthened glass of the first embodiment with respect to properties other than the surface resistivity and the Young's modulus.

Chemically Strengthened Glass of Third Embodiment

A chemically strengthened glass of the third embodiment has a value obtained by dividing an $Na_2O$ concentration at a depth of 30 μm from a surface by a $Na_2O$ concentration at a depth of 90 μm from the surface of 1.30 or less. In the chemically strengthened glass of the third embodiment, the value obtained by dividing the $Na_2O$ concentration at a depth of 30 m from the surface by a $Na_2O$ concentration at a depth of 90 μm from the surface is preferably 1.25 or less, more preferably 1.2 or less, still more preferably 1.15 or less, even more preferably 1.1 or less, and particularly preferably 1 or less. When the above value is 1.30 or less, a sodium concentration profile in the glass is flat, the surface layer compressive stress can be reduced, the internal tensile stress can be reduced, and a large deep layer compressive stress can be achieved. In addition, as compared with the related-art, an increase in surface resistivity can be effectively prevented and the peeling-off of the coating can be prevented.

In the chemically strengthened glass of the third embodiment, the lower limit of the value obtained by dividing the $Na_2O$ concentration at a depth of 30 μm from the surface by an $Na_2O$ concentration at a depth of 90 μm from the surface is not particularly limited.

In the chemically strengthened glass of the third embodiment, a value obtained by dividing an $Na_2O$ concentration at a depth of 50 μm from the surface by an $Na_2O$ concentration at a sheet thickness center portion is preferably 2 or more and 4 or less. When the above value is 2 or more and 4 or less, the surface layer compressive stress can be further reduced, the internal tensile stress can be reduced, and the deep layer compressive stress can be further increased.

In the chemically strengthened glass of the third embodiment, the value obtained by dividing the $Na_2O$ concentration at a depth of 50 μm from the surface by the $Na_2O$ concentration at the sheet thickness center portion is preferably 2 or more, more preferably 2.5 or more, still more preferably 2.7 or more, even more preferably 2.8 or more, and particularly preferably 2.9 or more. In addition, the above value is preferably 4 or less, more preferably 3.5 or less, still more preferably 3.3 or less, even more preferably 3.2 or less, and particularly preferably 3.1 or less.

In the chemically strengthened glass of the third embodiment, a value obtained by dividing the $Na_2O$ concentration at a depth of 90 μm from the surface by the $Na_2O$ concentration at the sheet thickness center portion is preferably 2.4 or more. The value is more preferably 2.5 or more, still more preferably 2.7 or more, and particularly preferably 3.0 or more. When the above value is 2.4 or more, the deep layer stress that influences the #80 sandpaper drop strength can be efficiently increased, and a large deep layer compressive stress can be achieved.

In the chemically strengthened glass of the third embodiment, the upper limit of the value obtained by dividing the $Na_2O$ concentration at a depth of 90 μm from the surface by the $Na_2O$ concentration at the sheet thickness center portion is not particularly limited, and is generally preferably 6.0 or less.

It is preferable that the chemically strengthened glass of the third embodiment has the same properties as the chemically strengthened glass of the first embodiment with respect to properties other than the $Na_2O$ concentration profile.

<<Application of Chemically Strengthened Glass>>

The present chemically strengthened glass is also useful as a cover glass used in an electronic device such as a mobile device, for example, a mobile phone or a smartphone. Further, the present chemically strengthened glass is also useful for a cover glass of an electronic device such as a television, a personal computer, and a touch panel, an elevator wall surface, or a wall surface (full-screen display) of a construction such as a house and a building, which is not intended to be carried. In addition, the present chemically strengthened glass is also useful as a building material such as a window glass, a table top, an interior of an automobile, an airplane, or the like, and a cover glass thereof, or useful for a casing having a curved surface shape.

<<Base Composition of Chemically Strengthened Glass>>

In the present description, the "base composition of the chemically strengthened glass" refers to the composition of the glass before chemical strengthening.

The composition will be described later. The composition of the present chemically strengthened glass is similar to the composition of the glass before strengthening as a whole except for a case where an extreme ion exchange treatment is performed, and generally, the composition of the glass before strengthening is equivalent to the composition of the chemically strengthened glass at the sheet thickness center. Particularly, the composition of the deepest portion from the glass surface is the same as the composition of the glass before strengthening, except for the case where an extreme ion exchange treatment is performed.

The base composition of the present chemically strengthened glass preferably contains $SiO_2$, $Li_2O$, and $Al_2O_3$.

The base composition of the present chemically strengthened glass according to one embodiment preferably contains, in mol % in terms of oxide, 52% to 75% of $SiO_2$, 3% to 15% of $Li_2O$, and 8% to 25% of $Al_2O_3$. Hereinafter, the glass having such a composition will be referred to as a $glass_{X1}$.

The $glass_{X1}$ more preferably contains,

55% to 75% of $SiO_2$,
3% to 15% of $Li_2O$,
8% to 25% of $Al_2O_3$
1% to 5% of $Na_2O$,
0% to 3% of $K_2O$,
0% to 10% of MgO,
0% to 10% of CaO,
0% to 5% of SrO,
0% to 5% of ZnO,
0% to 3% of $TiO_2$,
0% to 3% of $ZrO_2$,
0% to 1% of $SnO_2$,
0% to 1% of $P_2O_5$,
0% to 10% of $B_2O_3$,
0% to 3% of $Y_2O_3$, and
0% to 0.1% of $Fe_2O_3$.

The base composition of the present chemically strengthened glass according to another embodiment preferably contains, in mol % in terms of oxide, 40% to 70% of $SiO_2$, 10% to 35% of $Li_2O$, and 1% to 15% of $Al_2O_3$. Hereinafter, the glass having such a composition will be referred to as a glass$_{X2}$. In the case where the chemically strengthened glass is a crystallized glass, the base composition thereof is preferably the composition of the glass$_{X2}$.

As one form, the glass$_{X2}$ preferably contains, in mol % in terms of oxide,

40% to 70% of $SiO_2$,
10% to 35% of $Li_2O$,
1% to 15% of $Al_2O_3$,
0.5% to 5% of $P_2O_5$,
0.5% to 5% of $ZrO_2$,
0% to 10% of $B_2O_3$,
0% to 3% of $Na_2O$,
0% to 1% of $K_2O$, and
0% to 4% of $SnO_2$.

As another form, the glass$_{X2}$ preferably contains, in mol % in terms of oxide, 50% to 70% of $SiO_2$,
15% to 30% of $Li_2O$,
1% to 10% of $Al_2O_3$,
0.5% to 5% of $P_2O_5$,
0.5% to 8% of $ZrO_2$,
0.1% to 10% of MgO,
0% to 5% of $Y_2O_3$,
0% to 10% of $B_2O_3$,
0% to 3% of $Na_2O$,
0% to 1% of $K_2O$, and
0% to 2% of $SnO_2$.

Hereinafter, the glass composition will be described.

$SiO_2$ is a component constituting a glass framework. It is also a component that improves the chemical durability and a component that reduces occurrence of cracks when the glass surface is scratched.

In the glass$_{X1}$, the content of $SiO_2$ is 55% or more, preferably 60% or more, more preferably 61% or more, still more preferably 62% or more, and particularly preferably 65% or more. On the other hand, the content of $SiO_2$ is 75% or less, preferably 72% or less, more preferably 70% or less, still more preferably 67% or less, and particularly preferably 66.5% or less from the viewpoint of improving the meltability.

In the glass$_{X2}$, the content of $SiO_2$ is preferably 45% or more. The content of $SiO_2$ is more preferably 48% or more, still more preferably 50% or more, particularly preferably 52% or more, and extremely preferably 54% or more. On the other hand, the content of $SiO_2$ is preferably 70% or less, more preferably 68% or less, still more preferably 66% or less, and particularly preferably 64% or less in order to improve the meltability.

$Al_2O_3$ is an effective component from the viewpoint of improving the ion exchange performance during chemical strengthening and increasing the surface compressive stress after strengthening.

In the glass$_{X1}$, the content of $Al_2O_3$ is 8% or more, preferably 9% or more, more preferably 10% or more, still more preferably 11% or more, and particularly preferably 12% or more. On the other hand, when the content of $Al_2O_3$ is too large, crystals are likely to grow during melting, and a decrease in yield due to devitrification defects is likely to occur. In addition, the viscosity of the glass increases and the meltability of the glass decreases. The content of $Al_2O_3$ is 25% or less, preferably 22% or less, more preferably 20% or less, still more preferably 18% or less, and particularly preferably 16% or less.

In the glass composition$_{X2}$, the content of $Al_2O_3$ is preferably 1% or more, more preferably 2% or more, still more preferably 3% or more, 5% or more, 5.5% or more, and 6% or more in order, particularly preferably 6.5% or more, and most preferably 7% or more. On the other hand, the content of $Al_2O_3$ is preferably 15% or less, more preferably 12% or less, still more preferably 10% or less, particularly preferably 9% or less, and most preferably 8% or less in order to prevent the devitrification temperature of the glass from being too high.

Both $SiO_2$ and $Al_2O_3$ are components that stabilize the structure of the glass in the glass$_{X1}$, and the total content is preferably 65% or more, more preferably 70% or more, and still more preferably 75% or more in order to reduce the brittleness.

$Li_2O$ is a component that forms the surface compressive stress by ion exchange, and is a component that improves the meltability of the glass. When the chemically strengthened glass contains $Li_2O$, a stress profile with a large surface compressive stress and a large compressive stress layer is obtained by a method of performing ion exchange of lithium ions on the glass surface with sodium ions, and further ion exchange of sodium ions with potassium ions.

In the glass$_{X1}$, the content of $Li_2O$ is 3% or more, preferably 5% or more, more preferably 7% or more, still more preferably 9% or more, particularly preferably 10% or more, and most preferably 11% or more, from the viewpoint of easily obtaining a preferred stress profile. On the other hand, when the content of $Li_2O$ is too large, problems of an increase in crystal growth rate during glass forming and a decrease in yield due to devitrification defects increase. The content of $Li_2O$ is 15% or less, preferably 14% or less, more preferably 13% or less, and particularly preferably 12% or less.

In the glass$_{X2}$, the content of $Li_2O$ is preferably 10% or more, more preferably 14% or more, still more preferably 15% or more, even more preferably 18% or more, particularly preferably 20% or more, and most preferably 22% or more. On the other hand, the content of $Li_2O$ is preferably 35% or less, more preferably 32% or less, still more preferably 30% or less, particularly preferably 28% or less, and most preferably 26% or less in order to stabilize the glass.

Both $Na_2O$ and $K_2O$ are not essential and are components that improves the meltability of the glass and reduces the crystal growth rate of the glass. In the glass$_{X1}$, the total content of $Na_2O$ and $K_2O$, that is, $Na_2O+K_2O$, is preferably 2% or more in order to improve the ion exchange performance. In addition, the $Na_2O+K_2O$ is preferably 10% or less, preferably 9% or less, more preferably 8% or less, still more preferably 7% or less, and particularly preferably 5% or less.

$Na_2O$ is a component that forms a surface layer compressive stress layer in a chemical strengthening treatment using a potassium salt, and is a component that can improve the meltability of the glass.

In the glass$_{X1}$, the content of $Na_2O$ is 1% or more, preferably 2% or more, more preferably 3% or more, and still more preferably 4% or more in order to obtain this effect. On the other hand, the content is 5% or less, preferably 4% or less, more preferably 3.5% or less, and still more preferably 3% or less, from the viewpoint of avoiding a reduction in surface compressive stress (FSM-$CS_0$) during a strengthening treatment using a sodium salt, and from the viewpoint of achieving a profile with a large $CS_{90}$.

In the $glass_{X2}$, $Na_2O$ is not essential, but in the case where it is contained, the content thereof is preferably 0.5% or more, more preferably 1% or more, and particularly preferably 2% or more. When the content of $Na_2O$ is too large, crystals such as $Li_3PO_4$, which is a main crystal, are less likely to precipitate or the chemical strengthening properties deteriorate, and therefore, the content of $Na_2O$ is preferably 10% or less, more preferably 9% or less, still more preferably 8% or less, and particularly preferably 7% or less.

$K_2O$ may be contained for the purpose of improving the ion exchange performance.

In the $glass_{X1}$, in the case where $K_2O$ is contained, the content thereof is preferably 0.1% or more, more preferably 0.15% or more, and particularly preferably 0.2% or more. The content is preferably 0.5% or more, and more preferably 1.2% or more in order to further prevent devitrification. On the other hand, the content is 3% or less, preferably 2% or less, and more preferably 1% or less, since containing a large amount of K causes brittleness and a reduction in surface layer stress due to reverse exchange during strengthening.

In the $glass_{X2}$, in the case where $K_2O$ is contained, the content thereof is preferably 0.5% or more, more preferably 1% or more, still more preferably 1.5% or more, and particularly preferably 2% or more. When the content of $K_2O$ is too large, the chemical strengthening properties deteriorate or the chemical durability decreases, and therefore, the content thereof is preferably 5% or less, more preferably 4% or less, still more preferably 3% or less, particularly preferably 2% or less, and most preferably 1% or less.

Here, the balance of $Li_2O$, $Na_2O$, and $K_2O$ influences the ion exchange performance. In the $glass_{X1}$, a value obtained by dividing the content of $Li_2O$ in the composition by the total content of $Li_2O$, $Na_2O$ and $K_2O$, i.e., $Li_2O/[Li_2O+Na_2O+K_2O]$, is 0.5 or more and 0.9 or less. When the above value is 0.5 or more, Li ions in the glass and Na ions in the molten salt composition are exchanged efficiently. When the above value is 0.9 or less, it is possible to reduce the resistance of the glass. The $Li_2O/[Li_2O+Na_2O+K_2O]$ is preferably 0.55 or more, more preferably 0.60 or more, still more preferably 0.65 or more, and is preferably 0.85 or less, more preferably 0.80 or less, still more preferably 0.75 or less.

In the $glass_{X1}$, $Li_2O/Na_2O$, which is the ratio of the content of $Li_2O$ to the content of $Na_2O$, is 1.5 or more and 10 or less. When the $Li_2O/Na_2O$ is 1.5 or more, Li ions in the glass and Na ions in the molten salt composition are exchanged efficiently. When the $Li_2O/Na_2O$ is 10 or less, it is possible to reduce the resistance of the glass. The $Li_2O/Na_2O$ is preferably 2 or more, more preferably 4 or more, still more preferably 6 or more, and is preferably 9 or less, more preferably 8 or less, still more preferably 7 or less.

In the $glass_{X2}$, the total content of $Na_2O$ and $K_2O$, that is, $Na_2O+K_2O$, is preferably 1% or more, and more preferably 2% or more, in order to improve the meltability of the glass raw material. In addition, in the $glass_{X2}$, the ratio of the content of $K_2O$ to the total content of $Li_2O$, $Na_2O$, and $K_2O$ (hereinafter, R20), that is, $K_2O/R_2O$, is preferably 0.2 or less since the chemical strengthening properties can be improved and the chemical durability can be improved. The $K_2O/R_2O$ is more preferably 0.15 or less, and still more preferably 0.10 or less. Note that, $R_2O$ is preferably 10% or more, more preferably 15% or more, and still more preferably 20% or more. In addition, R20 is preferably 29% or less, and more preferably 26% or less.

MgO may be contained in order to lower the viscosity during melting. In the case where MgO is contained, the content thereof is preferably 1% or more, more preferably 2% or more, and still more preferably 3% or more. On the other hand, when the content of MgO is too large, it is difficult to enlarge the compressive stress layer during the chemical strengthening treatment and the resistance of the glass is increased. The content of MgO is 10% or less, preferably 9% or less, more preferably 8% or less, still more preferably 7% or less, and particularly preferably 6% or less.

CaO may be contained in order to lower the viscosity during melting. In the case where CaO is contained, the content thereof is preferably 1% or more, more preferably 2% or more, and still more preferably 3% or more. On the other hand, when the content of CaO is too large, the resistance of the glass is increased. The content of CaO is 10% or less, preferably 9% or less, more preferably 8% or less, still more preferably 7% or less, and particularly preferably 6% or less.

SrO may be contained in order to lower the viscosity during melting. In the case where SrO is contained, the content thereof is preferably 0.5% or more, more preferably 1% or more, and still more preferably 2% or more. On the other hand, when the content of SrO is too large, the resistance of the glass is increased. The content of SrO is 5% or less, preferably 4.5% or less, more preferably 4% or less, still more preferably 3.5% or less, and particularly preferably 3% or less.

In the case where ZnO is contained, the content thereof is preferably 0.5% or more, more preferably 1% or more, and still more preferably 2% or more. On the other hand, when the content of ZnO is too large, the coefficient of thermal expansion becomes smaller. The content of ZnO is 5% or less, preferably 4.5% or less, more preferably 4% or less, still more preferably 3.5% or less, and particularly preferably 3% or less.

In the case where $TiO_2$ is contained, the content thereof is preferably 0.05% or more, more preferably 0.1% or more, and still more preferably 0.2% or more. On the other hand, when the content of $TiO_2$ is too large, the devitrification occurs during melting of the glass. The content of $TiO_2$ is 3% or less, preferably 2.5% or less, more preferably 2% or less, still more preferably 1.7% or less, and particularly preferably 1.4% or less.

$ZrO_2$ does not have to be contained, but is preferably contained from the viewpoint of increasing the surface compressive stress of the chemically strengthened glass. In the case where $ZrO_2$ is contained, the content thereof is preferably 0.1% or more, more preferably 0.15% or more, still more preferably 0.2% or more, particularly preferably 0.25% or more, and typically 0.3% or more. On the other hand, when the content of $ZrO_2$ is too large, devitrification defects are likely to occur, and it is difficult to increase the compressive stress value during the chemical strengthening treatment. The content of $ZrO_2$ is 3% or less, preferably 2% or less, more preferably 1.5% or less, still more preferably 1% or less, and particularly preferably 0.8% or less.

$SnO_2$ may be contained as a refining agent during glass production. In the case where $SnO_2$ is contained, the content thereof is preferably 0.02% or more, more preferably 0.05% or more, and still more preferably 0.1% or more. On the other hand, when the content of $SnO_2$ is too large, the color tone may be influenced. The content of $SnO_2$ is 1% or less, preferably 0.5% or less, more preferably 0.3% or less, still more preferably 0.2% or less, and particularly preferably 0.1% or less.

In the $glass_{X1}$, $P_2O_5$ may be contained in order to enlarge the compressive stress layer due to chemical strengthening. In the case where $P_2O_5$ is contained, the content thereof is preferably 0.1% or more, more preferably 0.2% or more, and still more preferably 0.3% or more. On the other hand, when the content of $P_2O_5$ is too large, the durability against acids and bases decreases. The content of $P_2O_5$ is 1% or less, preferably 0.8% or less, more preferably 0.7% or less, still more preferably 0.6% or less, and particularly preferably 0.5% or less.

In the glass$_{X2}$, $P_2O_5$ is a constituent component of a $Li_3PO_4$ crystal and is essential.

The content of $P_2O_5$ is preferably 0.5% or more, more preferably 1% or more, still more preferably 1.5% or more, particularly preferably 2% or more, and extremely preferably 2.5% or more in order to promote the crystallization. On the other hand, when the content of $P_2O_5$ is too large, the phase separation is likely to occur during melting and the acid resistance remarkably decreases, and therefore, the content of $P_2O_5$ is preferably 5% or less, more preferably 4.8% or less, still more preferably 4.5% or less, and particularly preferably 4.2% or less.

In the glass$_{X2}$, $SiO_2$, $Al_2O_3$, $P_2O_5$, and $B_2O_3$ are network forming components (hereinafter also abbreviated as NWF) of the glass, and when the total amount of NWF is large, the strength of the crystallized glass is improved. Accordingly, the fracture toughness value of the crystallized glass is increased. From such a viewpoint, in the glass$_{X2}$, the total amount of NWF is preferably 60% or more, more preferably 63% or more, and particularly preferably 65% or more. However, a glass containing too many NWF has a high melting temperature and is difficult to produce, and therefore, the total amount of NWF is preferably 85% or less, more preferably 80% or less, and still more preferably 75% or less.

In the glass$_{X2}$, a ratio of the total amount of $Li_2O$, $Na_2O$, and $K_2O$ to the total amount of NWF, that is, $SiO_2$, $Al_2O_3$, $P_2O_5$, and $B_2O_3$ is preferably 0.20 to 0.60. $Li_2O$, $Na_2O$, and $K_2O$ are network modifying components, and decreasing the ratio to NWF increases gaps in the network, and therefore, the impact resistance is improved. Therefore, the ratio of the total amount of $Li_2O$, $Na_2O$, and $K_2O$ to NWF is preferably 0.60 or less, more preferably 0.55 or less, and particularly preferably 0.50 or less. On the other hand, since these components are necessary for chemical strengthening, the ratio of the total amount of $Li_2O$, $Na_2O$, and $K_2O$ to NWF is preferably 0.20 or more, more preferably 0.25 or more, and particularly preferably 0.30 or more in order to improve the chemical strengthening properties.

$B_2O_3$ may be contained in order to improve the scratch resistance of the glass. In the case where $B_2O_3$ is contained, the content thereof is preferably 1% or more, more preferably 3% or more, and still more preferably 5% or more. On the other hand, when the content of $B_2O_3$ is too large, striae may be generated during melting or the phase separation is likely to occur, and the quality of the glass for chemical strengthening is likely to decrease. The content of $B_2O_3$ is 10% or less, preferably 9.5% or less, more preferably 9% or less, still more preferably 8.5% or less, and particularly preferably 8% or less.

In the glass$_{X1}$, $B_2O_3/P_2O_5$ is preferably 2.5 or more and 500 or less. When the $B_2O_3/P_2O_5$ is 2.5 or more, the occurrence of striae during melting of the glass is prevented and stable production is possible. The $B_2O_3/P_2O_5$ is more preferably 5 or more, still more preferably 10 or more, and particularly preferably 50 or more. When the $B_2O_3/P_2O_5$ is 500 or less, a glass easy to undergo ion exchange and having scratch resistant is obtained. The $B_2O_3/P_2O_5$ is more preferably 450 or less, still more preferably 400 or less, particularly preferably 300 or less, and most preferably 250 or less.

$Y_2O_3$ may be contained in order to increase the fracture toughness value of the glass. When $Y_2O_3$ is contained, the content thereof is preferably 0.1% or more, more preferably 0.2% or more, still more preferably 0.5% or more, and particularly preferably 1% or more. On the other hand, when the content is too large, it is difficult to enlarge the compressive stress layer during the chemical strengthening treatment. The content of $Y_2O_3$ is 3% or less, preferably 2.5% or less, more preferably 2% or less, and still more preferably 1.5% or less.

$Fe_2O_3$ may be contained in order to reduce the resistance of the glass. In the case where $Fe_2O_3$ is contained, the content thereof is preferably 0.01% or more, more preferably 0.02% or more, and still more preferably 0.04% or more. On the other hand, when the content of $Fe_2O_3$ is too large, the glass is colored, impairing the marketability as a cover glass for electronic devices. The content of $Fe_2O_3$ is 0.1% or less, preferably 0.09% or less, more preferably 0.08% or less, still more preferably 0.07% or less, and particularly preferably 0.06% or less.

BaO, SrO, MgO, CaO, and ZnO are all components that improve the meltability of the glass, and may be contained.

Among them, BaO, SrO, and ZnO may be contained in the glass$_{X2}$ in order to increase a refractive index of a residual glass to be close to a precipitated crystal phase, thereby increasing a light transmittance and decreasing a haze value of the crystallized glass. In this case, the total content of BaO, SrO, and ZnO (hereinafter, BaO+SrO+ZnO) is preferably 0.3% or more, more preferably 0.5% or more, still more preferably 0.7% or more, and particularly preferably 1% or more. On the other hand, these components may decrease the ion exchange rate. The BaO+SrO+ZnO is preferably 2.5% or less, more preferably 2% or less, still more preferably 1.7% or less, and particularly preferably 1.5% or less in order to improve the chemical strengthening properties.

$La_2O_3$, $Nb_2O_5$, and $Ta_2O_5$ are all components that prevent fragments from scattering when the chemically strengthened glass cracks, and may be contained in order to increase the refractive index. In the case where these components are contained, the total content of $La_2O_3$, $Nb_2O_5$, and $Ta_2O_5$ (hereinafter, $La_2O_3+Nb_2O_5+Ta_2O_5$) is preferably 0.5% or more, more preferably 1% or more, still more preferably 1.5% or more, and particularly preferably 2% or more. In addition, the $La_2O_3+Nb_2O_5+Ta_2O_5$ is preferably 4% or less, more preferably 3% or less, still more preferably 2% or less, and particularly preferably 1% or less in order to prevent the devitrification of the glass during melting.

In addition, $CeO_2$ may be contained. $CeO_2$ may prevent coloring by oxidation of the glass. In the case where $CeO_2$ is contained, the content thereof is preferably 0.03% or more, more preferably 0.05% or more, and still more preferably 0.07% or more. The content of $CeO_2$ is preferably 1.5% or less, and more preferably 1.0% or less in order to improve the transparency.

When the chemically strengthened glass is colored and used, a coloring component may be added within a range that does not impede achievement of desired chemical strengthening properties. Examples of the coloring component include $Co_3O_4$, $MnO_2$, $Fe_2O_3$, NiO, CuO, $Cr_2O_3$, $V_2O_5$, $Bi_2O_3$, $SeO_2$, $Er_2O_3$, and $Nd_2O_3$.

The total content of the coloring component is preferably in a range of 1% or less. When it is desired to further increase a visible light transmittance of the glass, these components are preferably not substantially contained.

$HfO_2$, $Nb_2O_5$, and $Ti_2O_3$ may be added in order to improve the weather resistance against ultraviolet light irradiation. In the case where $HfO_2$, $Nb_2O_5$, and $Ti_2O_3$ are added for the purpose of improving the weather resistance against ultraviolet light irradiation, the total content thereof is preferably 1% or less, more preferably 0.5% or less, and still more preferably 0.1% or less in order to reduce influences on other properties.

$SO_3$, a chloride, and a fluoride may be appropriately contained as a refining agent or the like during melting of the glass. The total content of components that function as a refining agent is, in mass % in terms of oxide, preferably 2% or less, more preferably 1% or less, and still more preferably 0.5% or less since the strengthening properties and the crystallization behavior may be influenced when added too much. The lower limit thereof is not particularly limited, and is typically preferably 0.05% or more in mass % in terms of oxide.

In the case where $SO_3$ is used as the refining agent, the content of $SO_3$ is, in mass % in terms of oxide, preferably 0.01% or more, more preferably 0.05% or more, and still more preferably 0.1% or more since the effect cannot be obtained when the content is too small. In addition, in the case where $SO_3$ is used as the refining agent, the content of $SO_3$ is, in mass % in terms of oxide, preferably 1% or less, more preferably 0.8% or less, and still more preferably 0.6% or less.

In the case where Cl is used as the refining agent, the content of Cl is, in mass % in terms of oxide, preferably 1% or less, more preferably 0.8% or less, and still more preferably 0.6% or less since physical properties such as the strengthening properties may be influenced when added too much. In addition, in the case where Cl is used as the refining agent, the content of Cl is, in mass % in terms of oxide, preferably 0.05% or more, more preferably 0.10% or more, and still more preferably 0.2% or more since the effect cannot be obtained when the content is too small.

In the case where $SnO_2$ is used as the refining agent, the content of $SnO_2$ is, in mass % in terms of oxide, preferably 1% or less, more preferably 0.5% or less, and still more preferably 0.3% or less since the crystallization behavior may be influenced when added too much. In addition, in the case where $SnO_2$ is used as the refining agent, the content of $SnO_2$ is, in mass % in terms of oxide, preferably 0.02% or more, more preferably 0.05% or more, and still more preferably 0.1% or more since the effect cannot be obtained when the content is too small.

$As_2O_3$ is preferably not contained. Impurities such as $Sb_2O_3$ may be contained as a trace component. In the case where $Sb_2O_3$ is contained, the content thereof is preferably 0.3% or less, and more preferably 0.1% or less, and it is most preferably that $Sb_2O_3$ is not contained.

As the base composition of the present chemically strengthened glass, specifically, for example, glasses having the following compositions (i) to (iii) are preferred.

(i) a glass containing 66% of $SiO_2$, 11% of $Li_2O$, 11% of $Al_2O_3$, 5.5% of $Na_2O$, 1.5% of $K_2O$, 1.3% of $ZrO_2$, 3% of MgO, 0.5% of $Y_2O_3$, and 0.3% of other components.

(ii) a glass containing 68% of $SiO_2$, 11% of $Li_2O$, 12% of $Al_2O_3$, 1.6% of $Na_2O$, 1.6% of $K_2O$, 0.6% of $ZrO_2$, 1.4% of $Y_2O_3$, 3.5% of MgO, and 0.3% of other components.

(iii) a glass containing 57% of $SiO_2$, 11% of $Li_2O$, 18% of $Al_2O_3$, 3% of $Na_2O$, 0.5% of $K_2O$, 0.5% of $P_2O_5$, 6% of $B_2O_3$, and 4.5% of MgO.

It is more preferable that the base composition of the present chemically strengthened glass including the first to third embodiments is the same as the composition described later in the section <Glass: Sixth Embodiment>.

<<Set Drop Strength>>

In the chemically strengthened glass of the present embodiment, the #80 drop strength is preferably 40 cm or more, more preferably 42 cm or more, still more preferably 43 cm or more, and particularly preferably 45 cm or more.

<<Four-Point Bending Strength>>

In the chemically strengthened glass of the present embodiment, the 4-point bending strength is preferably 550 MPa or more, more preferably 600 MPa or more, still more preferably 700 MPa or more, and particularly preferably 750 MPa or more.

Chemically Strengthened Glass Production Method: Fourth and Fifth Embodiments Hereinafter, a fourth embodiment and a fifth embodiment will be described as specific embodiments of a chemically strengthened glass production method according to the present invention. In the present description, the chemically strengthened glass production method according to the present invention, including the fourth embodiment and the fifth embodiment, is also abbreviated as "the present production method".

Chemically Strengthened Glass Production Method of Fourth Embodiment

A chemically strengthened glass production method according to the fourth embodiment of the present invention is a chemically strengthened glass production method including at least: a first ion exchange treatment of bringing a glass for chemical strengthening into contact with a first molten salt composition; and a second ion exchange treatment of bringing the glass for chemical strengthening into contact with a second molten salt composition after the first ion exchange treatment, in which in the first ion exchange treatment, the glass for chemical strengthening is brought into contact with the first molten salt composition at 350° C. to 450° C. for 150 minutes or longer, and the glass for chemical strengthening contains, in mol % in terms of oxide, 55% to 75% of $SiO_2$, 3% to 15% of $Li_2O$, and 8% to 25% of $Al_2O_3$.

Chemically Strengthened Glass Production Method of Fifth Embodiment

A chemically strengthened glass production method according to the fifth embodiment of the present invention is a chemically strengthened glass production method including at least: a first ion exchange treatment of bringing a glass for chemical strengthening into contact with a first molten salt composition; and a second ion exchange treatment of bringing the glass for chemical strengthening into contact with a second molten salt composition after the first ion exchange treatment, in which the first ion exchange treatment is performed at 350° C. to 450° C. for 150 minutes or longer, and the first molten salt composition contains a Li ion, and the glass for chemical strengthening contains, in mol % in terms of oxide, 55% to 75% of $SiO_2$, 3% to 15% of $Li_2O$, and 8% to 25% of $Al_2O_3$.

<<Glass for Chemical Strengthening>>

In one form, a composition of a glass for chemical strengthening of the present embodiment contains, in mol % in terms of oxide, 55% to 75% of $SiO_2$, 3% to 15% of $Li_2O$, and 8% to 25% of $Al_2O_3$. In another form, a composition of the glass for chemical strengthening of the present embodiment contains, in mol % in terms of oxide, 40% to 70% of $SiO_2$, 10% to 35% of $Li_2O$, and 1% to 15% of $Al_2O_3$. For example, the glass for chemical strengthening preferably has the composition described above in the section <<Base Composition of Chemically Strengthened Glass>>, and more preferably has a composition described below in the section <Glass: Sixth Embodiment>.

In order to obtain a glass having the composition, the glass raw materials are appropriately mixed, and heated and melted in a glass melting furnace. Thereafter, the molten glass is homogenized by bubbling, stirring, addition of a refining agent, and the like, and formed into a glass sheet having a predetermined thickness, followed by annealing. Alternatively, the molten glass may be formed into a block shape, annealed, and then formed into a sheet shape by a cutting method.

Examples of the method for forming the glass into a sheet shape include a float method, a press method, a fusion method, and a down-draw method. The float method is particularly preferred in the case of producing a large glass sheet. As a continuous forming method other than the float method, for example, a fusion method and a down-draw method are also preferred.

The glass for chemical strengthening may be a crystallized glass. In the case of a crystallized glass, a crystallized glass including 1 or more crystals selected from the group consisting of a lithium silicate crystal, a lithium aluminosilicate crystal, and a lithium phosphate crystal is preferred. The lithium silicate crystal is preferably a lithium metasilicate crystal, a lithium disilicate crystal, or the like. The lithium phosphate crystal is preferably a lithium orthophosphate crystal or the like. The lithium aluminosilicate crystal is preferably a (3-spodumene crystal, a petalite crystal, or the like.

The crystallization rate of the crystallized glass is preferably 10% or more, more preferably 15% or more, still more preferably 20% or more, and particularly preferably 25% or more in order to improve the mechanical strength. The crystallization rate of the crystallized glass is preferably 70% or less, more preferably 60% or less, and particularly preferably 50% or less in order to improve the transparency. A low crystallization rate is also excellent in that the glass is easily bent by heating. The crystallization rate can be calculated based on the X-ray diffraction intensity by using the Rietveld method. The Rietveld method is described in "Crystal Analysis Handbook" edited by the Crystallographic Society of Japan "Crystal Analysis Handbook" editing committee (Kyoritsu Shuppan, 1999, p 492 to 499).

The average particle diameter of precipitated crystals of the crystallized glass is preferably 300 nm or less, more preferably 200 nm or less, still more preferably 150 nm or less, and particularly preferably 100 nm or less in order to improve the transparency. The average particle diameter of the precipitated crystals can be determined from a transmission electron microscope (TEM) image. It can also be estimated from a scanning electron microscope (SEM) image.

<<Chemical Strengthening Treatment>>

The chemical strengthening treatment is a treatment in which a glass is brought into contact with a metal salt by a method of immersing a glass into a melt of a metal salt (for example, potassium nitrate) containing metal ions having a large ion radius (typically, Na ions or K ions), and thereby metal ions having a small ion radius (typically, Na ions or Li ions) in the glass are substituted with the metal ions having a large ion radius (typically, Na ions or K ions for Li ions, and K ions for Na ions).

Examples of the molten salt for performing the chemical strengthening treatment include a nitrate, a sulfate, a carbonate, and a chloride. Among them, examples of the nitrate include lithium nitrate, sodium nitrate, potassium nitrate, cesium nitrate, and silver nitrate. Examples of the sulfate include lithium sulfate, sodium sulfate, potassium sulfate, cesium sulfate, and silver sulfate. Examples of the carbonate include lithium carbonate, sodium carbonate, and potassium carbonate. Examples of the chloride include lithium chloride, sodium chloride, potassium chloride, cesium chloride, and silver chloride. These molten salts may be used alone or in combination of plural types thereof.

The molten salt composition is preferably a composition containing a nitrate as a main component, and more preferably a composition containing sodium nitrate or potassium nitrate as a main component. Here, the expression "as a main component" means that a content in the molten salt composition is 80 mass % or more.

The present production method is characterized by sequentially including the following first ion exchange treatment and second ion exchange treatment.

(First ion exchange treatment) a step of bringing a glass for chemical strengthening into contact with a first molten salt composition.

(Second ion exchange treatment) a step of bringing the glass for chemical strengthening into contact with a second molten salt composition after the first ion exchange treatment.

In one embodiment of the present production method, it is preferable that in the first ion exchange treatment, the glass for chemical strengthening contains a first alkali metal ion, and the first molten salt composition contains a second alkali metal ion having an ion radius larger than that of the first alkali metal ion. In addition, it is preferable that in the second ion exchange treatment, a second molten salt composition contains a third alkali metal ion having an ion radius larger than that of the second alkali metal ion. More preferably, the second molten salt composition further contains the first alkali metal ion.

In the present embodiment, the first alkali metal ion in the glass for chemical strengthening is exchanged with the second alkali metal ion in the first molten salt composition by the first ion exchange treatment.

In addition, the second alkali metal ion in the glass for chemical strengthening is exchanged with the third alkali metal ion in the second molten salt composition by the second ion exchange treatment.

Figure 2:
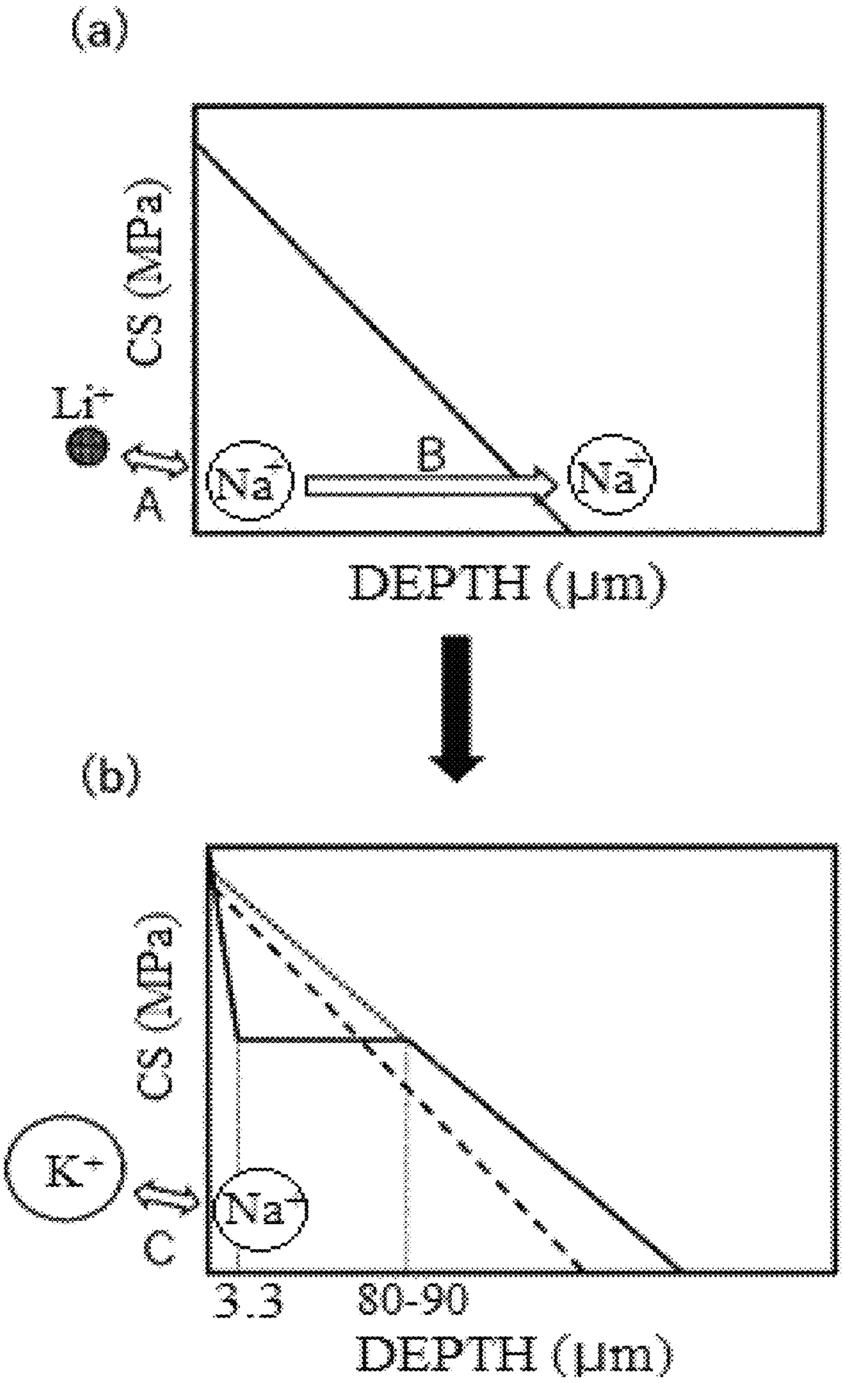
FIG. 2 shows a schematic diagram illustrating ion exchange in one embodiment of the present invention. (a) of FIG. 2 shows a first ion exchange treatment, and (b) of FIG. 2 shows a second ion exchange treatment.

(a) and (b) of FIG. 2 show a schematic diagram illustrating ion exchange in the present embodiment. In the present embodiment, the first alkali metal ion is a lithium (Li) ion, the second alkali metal ion is a sodium (Na) ion, and the third alkali metal ion is a potassium (K) ion.

(a) of FIG. 2 shows the first ion exchange treatment, and (b) of FIG. 2 shows the second ion exchange treatment.

In the first ion exchange treatment, the following ion movements occur.

1-1) Ion exchange between the first alkali metal ion in the glass for chemical strengthening and the second alkali metal ion in the first molten salt composition is performed to introduce the second alkali metal ion into the glass.

1-2) Ion exchange between the second alkali metal ion introduced into the glass for chemical strengthening by the ion exchange in the above 1-1) and the first alkali metal ion in the first molten salt composition [reverse ion exchange, A in (a) of FIG. 2] is performed to remove the second alkali metal ion from the glass.

Accordingly, the excess second alkali metal ion in the glass surface layer can be reduced and the tensile stress can be controlled to be less than the CT limit value.

1-3) The second alkali metal ion is diffused from the glass surface to a depth of preferably about 18% of the sheet thickness [B in (a) of FIG. 2]. Accordingly, the $CS_{90}$ can be increased at a stage of the first ion exchange treatment.

In the second ion exchange treatment, the following ion movements occur.

2-1) Exchange between the third alkali metal ion in the second molten salt composition and the second alkali metal ion in the glass for chemical strengthening is performed to introduce the third alkali metal ion to the glass surface layer. Accordingly, the surface compressive stress of the glass can be increased [C in (b) of FIG. 2].

2-2) The second alkali metal ion diffused into the glass in the above 1-3) is further diffused into the deep layer portion of the glass. Accordingly, the $CS_{90}$ can be increased.

With the above ion movements, as shown in (b) of FIG. 2, it is possible to form a stress profile having a large surface layer compressive stress by, for example, by reducing the compressive stress by reducing the second alkali metal ion in a region of from a depth of about 3.3 μm from the surface to a depth of about 80 μm to 90 μm from the surface, maintaining a large CS in a region at a depth of more than 90 μm from the surface.

Hereinafter, details of each ion exchange treatment in the present production method will be described.

<<First Ion Exchange Treatment>>

The first ion exchange treatment is a step of bringing a glass for chemical strengthening into contact with a first molten salt composition. In the present embodiment, the temperature and the time in the first ion exchange treatment are preferably set by observing the saturation behavior of the compressive stress layer depth DOC as the first ion exchange time progresses. Specifically, for example, in the first ion exchange treatment, the temperature and the time are preferably set such that the compressive stress layer depth DOC is greater than 180×t (μm), with the sheet thickness being t (mm).

When the DOC is greater than 180×t, the $CS_{90}$ can be further increased.

In one embodiment, the temperature at which the first molten salt composition and the glass for chemical strengthening are brought into contact with each other in the first ion exchange treatment is preferably 350° C. or higher, more preferably 360° C. or higher, and still more preferably 380° C. or higher. When the temperature of the first molten salt composition is 350° C. or higher, the reverse ion exchange occurs sufficiently to reduce the stress on the glass surface layer, and it is easy to introduce a compressive stress layer depth to about 18% of the sheet thickness, making it easy to increase the $CS_{90}$. The temperature of the first molten salt composition is generally 450° C. or lower from the viewpoint of danger caused by evaporation and a change in composition of the molten salt.

When the time during which the first molten salt composition and the glass for chemical strengthening are brought into contact with each other in the first ion exchange treatment is 150 minutes or longer, the reverse ion exchange occurs sufficiently to reduce the stress on the glass surface layer, and it is easy to introduce a compressive stress layer depth to about 18% of the sheet thickness, making it easy to increase the $CS_{90}$. The time is more preferably 180 minutes or longer, and still more preferably 210 minutes or longer.

Specifically, for example, in the case where the temperature of the first molten salt composition with which the glass for chemical strengthening is brought into contact is 420° C., the contact time is preferably 360 minutes or longer and 660 minutes or shorter. In the case where the temperature of the first molten salt composition with which the glass for chemical strengthening is brought into contact is higher than 420° C., the contact time is preferably 600 minutes or shorter.

In one embodiment, in the first ion exchange treatment, it is preferable that a time t1 (minutes) for immersing the glass for chemical strengthening in the first molten salt composition satisfies the following expression with respect to a temperature T (° C.) of the first molten salt composition. Accordingly, the $CS_{90}$ can be maximized.

$$-7.5T+3400<t1<-7.5T+3850$$

The t1 (minutes) is preferably longer than (−7.5T+3400), more preferably (−7.5T+3500) or longer, and still more preferably (−7.5T+3550) or longer. In addition, the t1 (minutes) is preferably shorter than (−7.5T+3850), more preferably (−7.5T+3800) or shorter, and still more preferably (−7.5T+3700) or shorter.

In the fourth embodiment, the first molten salt composition preferably contains a lithium ion. In the fifth embodiment, the first molten salt composition contains a lithium ion. The content of the lithium ion in the first molten salt composition can be set, for example, as follows. When determining the temperature and the time based on the saturation behavior of the DOC as the first ion exchange treatment progresses, a lithium ion concentration that can keep the number of fragments during damage to the CT limit or less is simulated. The lithium ion concentration to be contained in the first molten salt composition can be determined based on this concentration.

In one embodiment, the content of the lithium ion in the first molten salt composition is preferably 0.010 mass % or more, more preferably 0.060 mass % or more, and still more preferably 0.15 mass % or more. When the content of the lithium ion in the first molten salt composition is 0.010 mass % or more, the reverse ion exchange is sufficiently promoted, the surface layer compressive stress is reduced, the internal tensile stress can be further reduced, and the number of fragments during damage can be easily kept to the CT limit or less. Since the lithium ion in the molten salt composition and $SiO_2$ in the glass component may combine to cause a crystalline appearance defect, the content of the lithium ion in the first molten salt composition is preferably 1.0 mass % or less, more preferably 0.80 mass % or less, and still more preferably 0.60 mass % or less.

In one embodiment, the content of sodium nitrate in the first molten salt composition is preferably 92 mass % or more, more preferably 92.5 mass % or more, 93.0 mass % or more, and 93.5 mass % or more in order, and still more preferably 94 mass % or more. When the content of sodium nitrate is within the above range, the $CS_{90}$ can be further increased by increasing the amount of the sodium ion introduced into the deep layer portion of the glass.

In one embodiment, in the case of adding potassium nitrate to the first molten salt composition, the content thereof is preferably 35 mass % or less, and more preferably 25 mass % or less, 15 mass % or less, and 5 mass % or less in order. When the content of potassium nitrate is within the above range, it is easy to sufficiently introduce the sodium ion into the deep layer portion of the glass.

<<Second Ion Exchange Treatment>>

The second ion exchange treatment is a step of bringing the glass for chemical strengthening into contact with a second molten salt composition after the first ion exchange treatment. In the present embodiment, it is preferable that the surface ion concentration in the glass for chemical strengthening after the first ion exchange treatment is measured to determine the Na/Li ratio, and the Na/Li ratio in the second molten salt composition is determined based on the above Na/Li ratio.

In one embodiment, it is preferable to set the temperature and the time of the second ion exchange treatment such that the value of the surface compressive stress layer depth DOL-tail is 3.3 μm or more. When the DOL-tail is 3.3 μm or more, the bending strength can be further improved and mass production is easy.

In one embodiment, the glass for chemical strengthening is preferably immersed in the second molten salt composition at a temperature of preferably 420° C. or higher. The temperature of the second molten salt composition is more preferably 422° C. or higher, and still more preferably 425° C. or higher. The temperature of the second molten salt composition is generally 450° C. or lower from the viewpoint of danger caused by evaporation and a change in composition of the molten salt, and is more preferably 435° C. or lower from the viewpoint of preventing an excessive stress reduction.

In one embodiment, the time during which the second molten salt composition and the glass for chemical strengthening are brought into contact with each other is preferably 0.5 hours or longer, more preferably 0.75 hours or longer, and still more preferably 1 hour or longer. When the above time is 0.5 hours or longer, the compressive stress can be further reduced in a region at a depth of about 80 μm to 90 μm from the surface, and the CS can be maintained larger in a region at a depth of more than 90 μm from the surface. On the other hand, when the contact time is too long, the $CS_{50}$ is reduced, so that it is preferable that the time is generally 4 hours or shorter.

Specifically, for example, in the case where the temperature of the second molten salt composition with which the glass for chemical strengthening is brought into contact is 420° C., the contact time is preferably 0.5 hours or longer and 2 hours or shorter, more preferably 0.5 hours or longer and 1.75 hours or shorter, and still more preferably 0.5 hours or longer and 1.5 hours or shorter.

In one embodiment, in the second ion exchange treatment, it is preferable that a time t2 (minutes) for immersing the glass for chemical strengthening in the second molten salt composition satisfies the following expression with respect to the temperature T (° C.) of the second molten salt composition. Accordingly, the value of the surface compressive stress layer depth DOL-tail is easily set to 3.3 μm or more.

$$-1\times T+450<t2<-4\times T+1740$$

The t2 (minutes) is preferably longer than (−1×T+450), more preferably (−1×T+455) or longer, and still more preferably (−1×T+460) or longer. In addition, the t2 (minutes) is preferably shorter than (−4×T+1740), more preferably (−4×T+1735) or shorter, and still more preferably (−4×T+1730) or shorter.

In the present embodiment, the second molten salt composition preferably contains 0 mass % or more and 5 mass % or less of lithium nitrate. When the content of lithium nitrate in the second molten salt composition is 0 mass % or more and 5 mass % or less, the stress due to potassium can be sufficiently introduced into the surface layer, the surface compressive stress can be increased, and the bending strength can be further improved.

In one embodiment, the content of potassium nitrate in the second molten salt composition is preferably 90 mass % or more, more preferably 92 mass % or more, and still more preferably 95 mass % or more. The upper limit thereof is not particularly limited, and is generally 99.9 mass % or less.

The second molten salt composition may contain sodium nitrate. In the case where the second molten salt composition contains sodium nitrate, the content thereof is preferably 0.1 mass % or more, and more preferably 0.3 mass % or more. When the content of sodium nitrate is within the above range, the effect of increasing the $CS_{90}$ is improved.

The second molten salt composition may further contain an additive other than nitrates. Examples of the additive include a silicic acid and a specific inorganic salt. When the second molten salt composition contains an additive, the FSM-$CS_0$ can be increased.

The second molten salt composition may contain a silicic acid as an additive. The silicic acid refers to a compound containing silicon, hydrogen, and oxygen represented by a chemical formula $nSiO_2 \cdot xH_2O$. Here, n and x are natural numbers. Examples of such a silicic acid include metasilicic acid ($SiO_2 \cdot H_2O$), metadisilicic acid ($2SiO_2 \cdot H_2O$), orthosilicic acid ($SiO_2 \cdot 2H_2O$), pyrosilicic acid ($2SiO_2 \cdot 3H_2O$), and silica gel [$SiO_2 \cdot mH_2O$ (m is a real number of 0.1 to 1)].

When an silicic acid is contained, the silicic acid adsorbs lithium ions, and potassium ions easily enter the glass, and therefore, it is possible to increase the stress in the surface layer by several micrometers while reducing the CT. The amount of the silicic acid added is preferably 0.1 mass % or more, more preferably 0.3 mass % or more, and most preferably 0.5 mass % or more. In addition, the amount of silicic acid added is preferably 3 mass % or less, more preferably 2 mass % or less, and most preferably 1 mass % or less.

The silicic acid is preferably silica gel [$SiO_2 \cdot mH_2O$ (m is a real number of 0.1 to 1)]. Silica gel has relatively large secondary particles, and thus has the advantage of being easy to precipitate in the molten salt and being easy to add and collect. There is also no worry about scattering dust, and safety of workers can be ensured. Further, since silica gel is a porous body and the molten salt is easily supplied to the surface of the primary particles, it has excellent reactivity and is highly effective in adsorbing lithium ions.

The second molten salt composition may contain a specific inorganic salt (hereinafter referred to as a flux) as an additive. A carbonate, a hydrogen carbonate, a phosphate, a sulfate, a hydroxide, and a chloride are preferred as the flux. At least one salt selected from the group consisting of $K_2CO_3$, $Na_2CO_3$, $KHCO_3$, $NaHCO_3$, $K_3PO_4$, $Na_3PO_4$, $K_2SO_4$, $Na_2SO_4$, KOH, NaOH, KCl, and NaCl is preferably contained. Particularly, at least one salt selected from the group consisting of $K_2CO_3$ and $Na_2CO_3$ is more preferably contained. $K_2CO_3$ is still more preferred.

The chemical strengthening treatment may be performed by two or more stages of ion exchange treatment. In the present embodiment, in the case of performing a three-stage ion exchange treatment, in a third ion exchange treatment, it is preferable to set conditions for the ion exchange treatment (for example, the composition of the molten salt composition, the temperature, and the time) such that the surface compressive stress is 1000 MPa or more.

In the case of performing a third ion exchange treatment of bringing the glass for chemical strengthening into contact with a third molten salt composition after the second ion exchange treatment, the third molten salt composition contains potassium nitrate in an amount of preferably 98 mass % or more, more preferably 98.5 mass % or more, and still more preferably 99 mass % or more.

When the content of potassium nitrate in the third molten salt composition is 98 mass % or more, the $CS_{90}$ can be further increased.

In the present embodiment, in the case of performing two or more stages of ion exchange, it is preferable that the glass for chemical strengthening has a CTave larger than the CTA after the first ion exchange treatment, and has a CTave less than the CTA by the second ion exchange treatment and subsequent ion exchange treatments.

The CT limit is determined according to the following equation (1). The CTA corresponds to the CT limit, and is a value determined based on the composition of the glass for chemical strengthening. In addition, the CTave is a value corresponding to a tensile stress average value, and the CTave is determined according to the following equation (2). When CTave <CTA, the CTave is below the CT limit, and an explosive increase in the number of fragments during damage can be prevented.

[Math. 3]

$$CTA = 317.93 \times K1c/\sqrt{t} + 228.5 \times t - 398 \quad \text{Equation (1)}$$

t: sheet thickness (mm)
K1c: fracture toughness value ($MPa \cdot m^{1/2}$)

$$CTave = ICT/LCT \quad \text{Equation (2)}$$

ICT: tensile stress integrated value (Pa·m)
LCT: sheet thickness direction length (μm) of tensile stress region When a compressive stress layer is formed on a surface portion of a glass article by the chemical strengthening treatment, a tensile stress necessarily occurs in a center portion of the glass article according to a total compressive stress of a surface. When the tensile stress value is too large, the glass article cracks violently and is scattered into fragments during damage. When the CT is greater than the CT limit as a threshold value thereof, the number of fragments during damage increases explosively. In the present embodiment, in the case of performing two or more stages of ion exchange, a maximum tensile stress value of a stress profile formed inside the glass by an initial ion exchange treatment (first ion exchange treatment) is preferably larger than the CT limit. When the maximum tensile stress value after the first ion exchange treatment is larger than the CT limit, the compressive stress is sufficiently introduced by the first ion exchange treatment, and in the subsequent second ion exchange treatment, a large $CS_{90}$ can be maintained even after a stress value of the glass surface layer is reduced.

Glass: Sixth Embodiment

A glass according to a sixth embodiment of the present invention contains: in mol % in terms of oxide:

55% to 75% of $SiO_2$;
8% to 25% of $Al_2O_3$;
3% to 15% of $Li_2O$;
1% to 5% of $Na_2O$;
0% to 3% of $K_2O$;
0% to 10% of MgO;
0% to 10% of CaO;
0% to 5% of SrO;
0% to 5% of ZnO;
0% to 3% of $TiO_2$;
0% to 3% of $ZrO_2$;
0% to 1% of $SnO_2$;
0% to 1% of $P_2O_5$;
0% to 10% of $B_2O_3$;
0% to 3% of $Y_2O_3$; and
0% to 0.1% of $Fe_2O_3$, in which
$Li_2O/[Li_2O+Na_2O+K_2O]$, which is a ratio of a content of $Li_2O$ to a total content of $Li_2O$, $Na_2O$, and $K_2O$, is 0.5 to 0.9,
$Li_2O/Na_2O$, which is a ratio of the content of $Li_2O$ to a content of $Na_2O$, is 1.5 to 10, and
a Young's modulus is 80 GPa or more.

Each composition is the same as the form described in the section <<Base Composition of Chemically Strengthened Glass>> in the third embodiment.

The glass of the present embodiment has, for example, the composition as described above. In order to obtain a glass having the above composition, the glass raw materials are appropriately mixed, and heated and melted in a glass melting furnace. Thereafter, the molten glass is homogenized by bubbling, stirring, addition of a refining agent, and the like, and formed into a glass sheet having a predetermined thickness, followed by annealing.

Alternatively, the molten glass may be formed into a block shape, annealed, and then formed into a sheet shape by a cutting method.

Examples of the method for forming the glass into a sheet shape include a float method, a press method, a fusion method, and a down-draw method. The float method is particularly preferred in the case of producing a large glass sheet. As a continuous forming method other than the float method, for example, a fusion method and a down-draw method are also preferred.

The glass of the present embodiment may be a crystallized glass. The crystallized glass is the same as that described above in the section <<Glass for Chemical Strengthening>>.

In the glass of the present embodiment, the Young's modulus is preferably 80 GPa or more, more preferably 82 GPa or more, still more preferably 84 GPa or more, and particularly preferably 85 GPa or more. When the Young's modulus is 80 GPa or more, a larger CTA can be achieved and the deep layer stress can be increased during chemical strengthening. The Young's modulus is not particularly limited in upper limit, and is generally 100 GPa or less, preferably 95 GPa or less, and more preferably 90 GPa or less, from the viewpoint of the processability of the glass.

In the glass of the present embodiment, in the case where a compressive stress layer is formed by an ion exchange treatment at 380° C. for 4 hours by using a molten salt made of sodium nitrate, $CS_{30}$ which is a compressive stress value at a depth of 30 μm from the surface of the compressive stress layer is preferably 150 MPa or more. When the $CS_{30}$ is 150 MPa or more, the CTA can be can easily increased by the ion exchange treatment, the surface layer compressive stress can be reduced and the internal tensile stress can be reduced, to further increase the deep layer compressive stress. The $CS_{30}$ is preferably 160 MPa or more, more preferably 170 MPa or more, and still more preferably 180 MPa or more.

EXAMPLES

Hereinafter, the present invention will be described with reference to Examples, but the present invention is not limited thereto.

<Evaluation on Amorphous Glass>

(Young's Modulus E)

Measurement was performed by using an ultrasonic method.

(Fracture Toughness Value K1c)

The fracture toughness value K1c (unit: $MPa \cdot m^{1/2}$) was measured by using the IF method in accordance with JIS R1607:2015.

[CTA Value]

The CTA value was determined according to the following equation (1).

[Math. 4]

$$CTA = 317.93 \times K1c/\sqrt{t} + 228.5 \times t - 398 \quad \text{Equation (1)}$$

t: sheet thickness (mm)

Table 1 shows the composition and evaluation results of the glass used in Test Examples described later.

TABLE 1

| mol % | Glass A | Glass B | Glass C |
|---|---|---|---|
| $SiO_2$ | 68 | 66 | 64 |
| $Al_2O_3$ | 12 | 11 | 18 |
| $Li_2O$ | 11 | 11 | 7 |
| $Na_2O$ | 1.6 | 5.5 | 4.5 |
| $K_2O$ | 1.6 | 1.4 | 0.5 |
| MgO | 3.5 | 3 | 0.5 |
| CaO | 0.2 | 0.2 | 1 |
| SrO | 0 | 0 | 0.5 |
| ZnO | 0 | 0 | 0 |
| $TiO_2$ | 0.1 | 0.1 | 0 |
| $ZrO_2$ | 0.6 | 1.3 | 0 |
| $SnO_2$ | 0 | 0 | 0 |
| $P_2O_5$ | 0 | 0 | 1 |
| $B_2O_3$ | 0 | 0 | 3 |
| $Y_2O_3$ | 1.4 | 0.5 | 0 |
| $Fe_2O_3$ | 0 | 0 | 0 |
| BaO | 0 | 0 | 0 |
| Total | 100 | 100 | 100 |
| $Li_2O + Na_2O + K_2O$ | 14.2 | 17.9 | 12 |
| $Li_2O/(Li_2O + Na_2O + K_2O)$ | 0.77 | 0.61 | 0.58 |
| $Li_2O/Na_2O$ | 6.9 | 2.0 | 1.6 |
| $B_2O_3/P_2O_5$ | — | — | 3 |
| Young's modulus (GPa) | 88.2 | 86 | 86 |
| Fracture toughness value ($MPa \cdot m^{1/2}$) | 0.82 | 0.81 | 0.82 |
| $CS_{30}$ (MPa) after ion exchange treatment for 4 hours at 380° C. with 100% $NaNO_3$ | 222 | 199 | 200 |

<Evaluation on Chemically Strengthened Glass>

A method for evaluating the chemically strengthened glass will be described below.

(EPMA)

The measurement by using an EPMA was performed as follows. First, a glass sample was embedded with an epoxy resin and mechanically polished in a direction perpendicular to a first main surface and a second main surface opposite to the first main surface to prepare a cross section sample. A C-coat was applied to the polished cross section, and measurement was performed by using an EPMA (JXA-8500F manufactured by JEOL Ltd.). A line profile of an X-ray intensity of Na was acquired at an interval of 1 μm at an acceleration voltage of 15 kV, a probe current of 30 nA, and an integration time of 1000 msec./point.

(Stress Profile)

A stress profile was measured using a scattered light photoelastic stress meter SLP-2000 and a film stress measurement FSM manufactured by Orihara Industrial Co., Ltd.

(Surface Resistivity)

(1) Sample Preparation and Film Formation Step

A glass sample having a size of 120 mm×60 mm×0.7 mm was used. Before measuring the surface resistivity, film formation was performed using the following procedure. A film was formed on the glass sample having a size of 120 mm×60 mm×0.7 mm by using a sputtering device. A platinum film was formed on the glass surface. During film formation, patterning was performed in accordance with JISR3256:1998.

(2) Surface Resistivity Measurement

The surface resistivity was measured by using the following method.

The measurement device used was ultra-microammeter 5450.

A glass sample having a size of 120 mm×60 mm×0.7 mm was used.

The measurement was performed by using a three-terminal method in accordance with JIS C2141:1992 and JIS R3256:1998.

The applied voltage was 100 V, and the value was measured 180 seconds after voltage application. The discharge time was 3 seconds.

(Drop Test)

In the drop strength test, the obtained glass sample of 120 mm×60 mm×0.7 mm was fitted into a structure whose mass and rigidity were adjusted to a size of a general smartphone currently used, to prepare a pseudo-smartphone, and was freely dropped on #80 SiC sandpaper. As the drop height, in the case where the glass sample did not crack after dropping from a height of 5 cm, an operation of increasing the height by 5 cm and performing dropping again until a crack occurs in the glass was repeated, and the height at the first crack was defined as the drop height. The result of the average crack height when a drop test was performed on 20 sheets in each example was defined as the "#80 sandpaper average set drop strength".

(4PB Strength)

A chemically strengthened glass was processed into a strip shape of 120 mm×60 mm, and a 4-point bending test was performed under the conditions including a distance between external fulcrums of a support of 30 mm, a distance between internal fulcrums of the support of 10 mm, and a crosshead speed of 5.0 mm/min to measure the 4-point bending strength. The number of the test pieces was 10. Note that, the chemically strengthened glass was processed into a strip shape, and then subjected to automatic chamfering (C-chamfering) by using a grindstone having a grit count of 1000 (manufactured by Tokyo Diamond Tools Mfg. Co., Ltd.), and an end surface thereof was mirror-finished by using a nylon brush having a diameter of 0.1 mm and SHOROX NZ abrasive grains (manufactured by Showa Denko Co., Ltd.) to obtain a glass of 120 mm×60 mm×0.7 mm in thickness for measurement.

Test Example 1

Glass raw materials were blended so as to have the composition of a glass A shown in Table 1 in mol % in terms of oxide, and weighed to obtain 800 g of glass. Next, the mixed glass raw materials were charged into a platinum crucible, followed by charging into an electric furnace at 1600° C., melted for about 5 hours, defoamed, and homogenized.

The obtained molten glass was poured into a mold, maintained at a temperature of the glass transition point for 1 hour, and then cooled to room temperature at a rate of 0.5° C./min, to obtain a glass block. The obtained glass block was cut, ground, and finally mirror-polished on both surfaces to obtain a glass sheet of 120 mm×60 mm having a sheet thickness of 0.7 mm.

Figure 3:
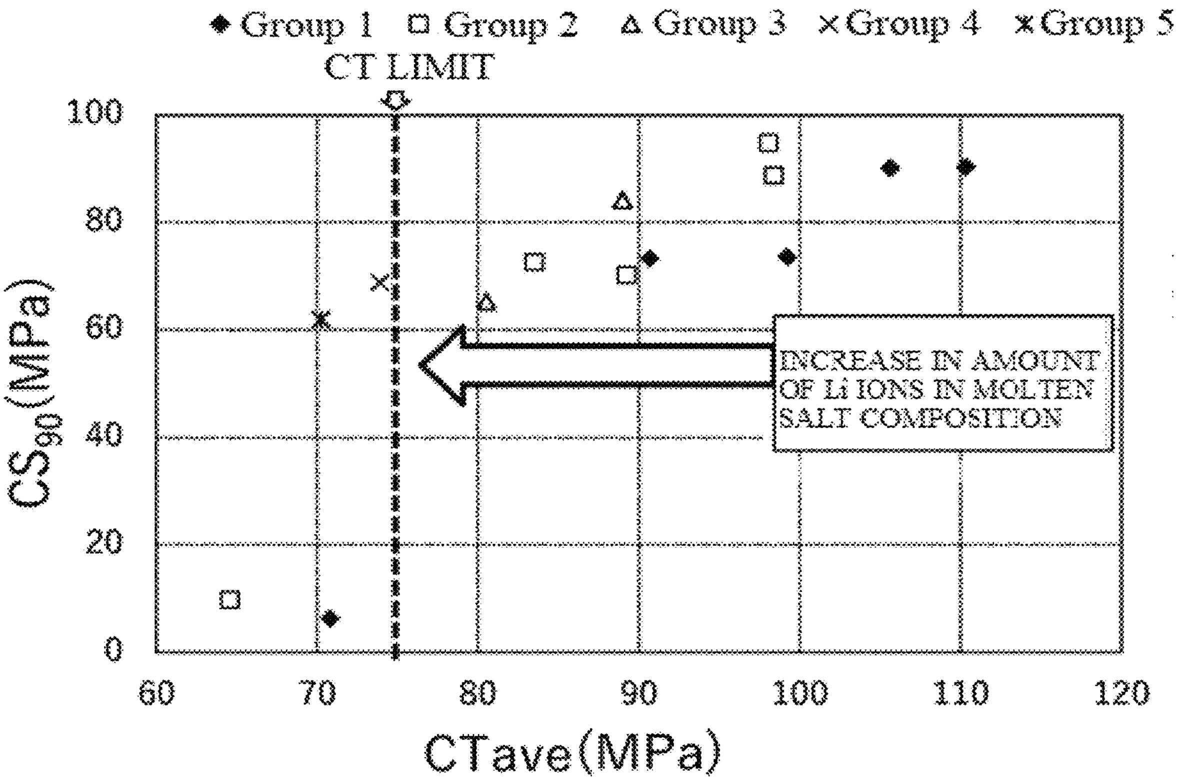
FIG. 3 is a diagram showing stress properties of a glass after one-stage chemical strengthening.

The glass sheet prepared in the above procedure was subjected to ion exchange under the conditions shown in Table 2 to obtain a chemically strengthened glass. FIG. 3 shows the results of measuring the CTave and the $CS_{90}$ of the obtained chemically strengthened glass. In FIG. 3, each group of Groups 1 to 3 shows the results of using a molten salt composition having the same component within the same group at the same temperature and changing the ion exchange time, as shown in Table 1.

TABLE 2

| | Molten salt composition | | | |
|---|---|---|---|---|
| | $NaNO_3$ content (wt %) | $LiNO_3$ content (wt %) | Temperature (° C.) | Time (min) |
| Group 1 | 100 | 0 | 420 | 120-1440 |
| Group 2 | 99 | 1 | 420 | 120-1440 |
| Group 3 | 97 | 3 | 420 | 300, 480 |
| Group 4 | 94 | 6 | 420 | 420 |
| Group 5 | 92 | 8 | 420 | 420 |

As shown in FIG. 3, when the ion exchange treatment is performed using a molten salt composition having a large amount of sodium ions, the CT is increased and the CTave is greater than the CT limit. On the other hand, when attempting to reduce the CT in the ion exchange treatment using the same molten salt composition, the deep layer stress tends to be reduced. As can be seen from this result, in the chemically strengthened glass production method of the present embodiment, when the amount of lithium ions contained in the molten salt composition is increased, a large deep layer stress can be achieved while the CTave is below the CT limit.

Test Example 2

Figure 4:
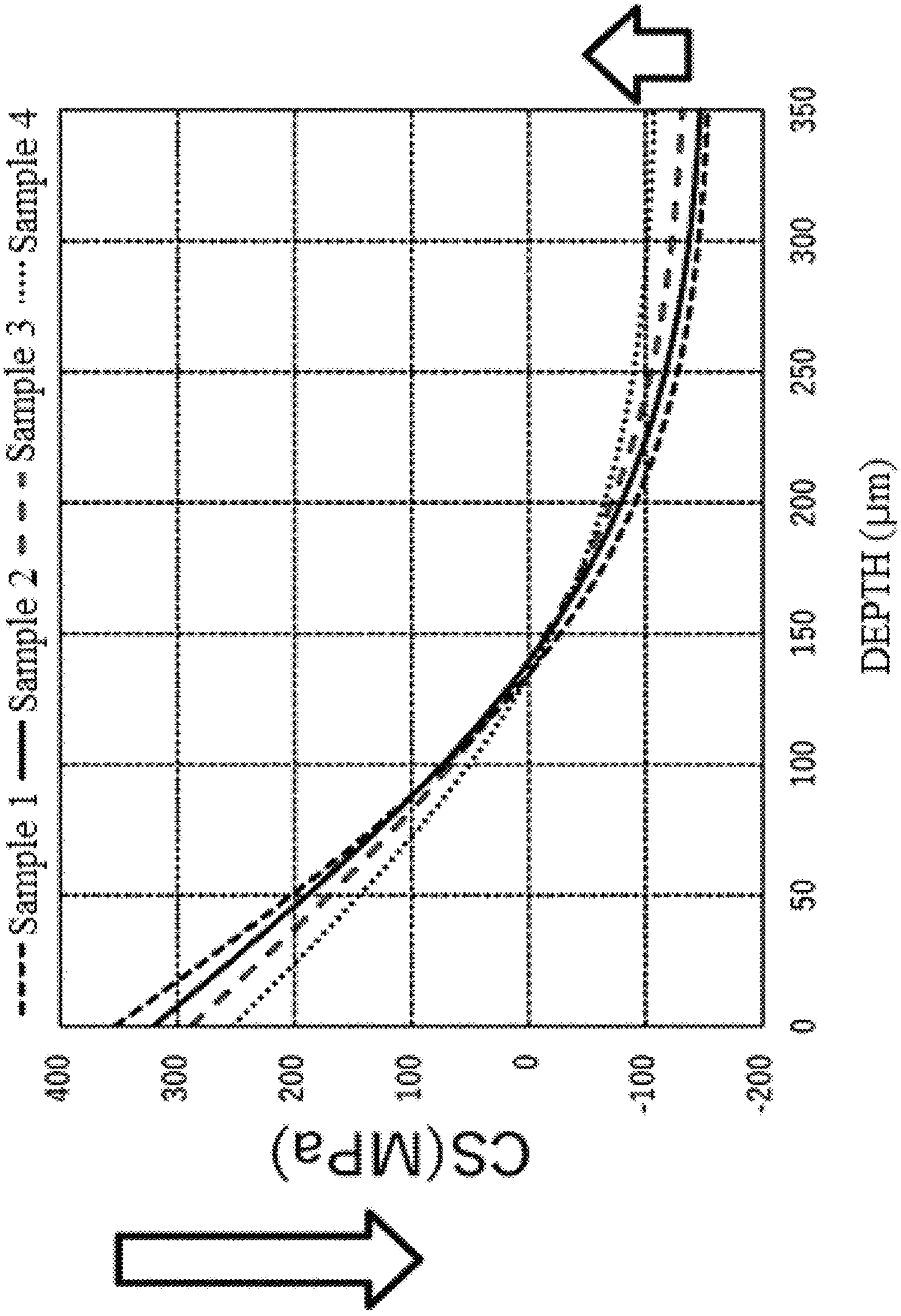
FIG. 4 is a diagram showing results of measuring a CS of a chemically strengthened glass.

A glass sheet made of the glass A was prepared in the same manner as in Test Example 1, and the glass sheet was subjected to ion exchange under the conditions shown in Table 3 to obtain a chemically strengthened glass. FIG. 4 shows the results of measuring the CS of the obtained chemically strengthened glass.

TABLE 3

| | Molten salt composition | | | |
|---|---|---|---|---|
| | $NaNO_3$ content (wt %) | $LiNO_3$ content (wt %) | Temperature (° C.) | Time (min) |
| Sample 1 | 100 | 0 | 420 | 480 |
| Sample 2 | 99 | 1 | 420 | 480 |
| Sample 3 | 97 | 3 | 420 | 480 |
| Sample 4 | 94 | 6 | 420 | 420 |

As shown in FIG. 4, when the molten salt composition contains lithium ions, the compressive stress at 0 μm to 80 μm from the surface layer is reduced, and as the content of the lithium ions increases, the compressive stress in the surface layer portion is reduced. Accordingly, since the internal tensile stress in the deep layer portion is reduced and falls below the CT limit, it is possible to increase the compressive stress in the deep layer portion while avoiding the CT limit.

Test Example 3

Figure 5:
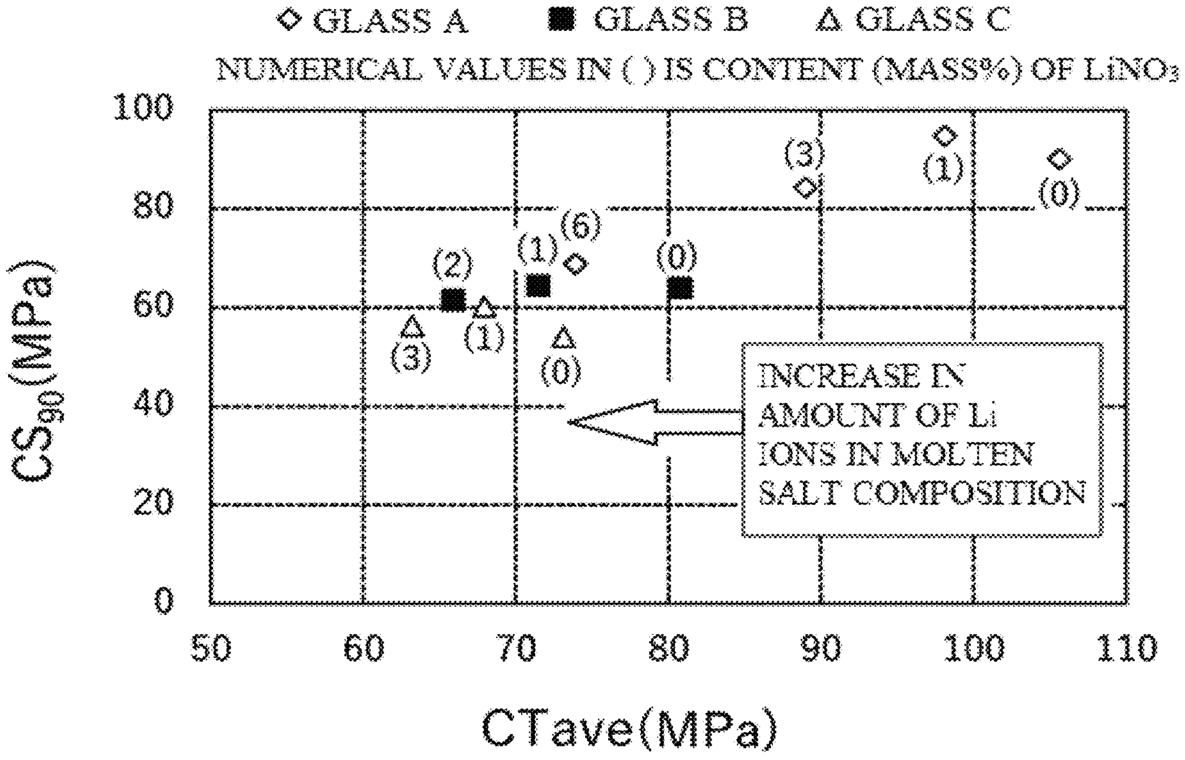
FIG. 5 is a diagram showing a correlation between CTave and $CS_{90}$ of a chemically strengthened glass.

A glass sheet made of the above glass A, and a glass sheet made of a glass B and a glass sheet made of a glass C having the glass compositions shown in Table 1 in mol % in terms of oxide were prepared in the same manner as in Test Example 1. Each of the obtained glass sheets was subjected to ion exchange under the conditions shown in Table 4 to obtain a chemically strengthened glass. FIG. 5 shows the results of plotting the $CS_{90}$ and the CTave of the obtained chemically strengthened glass by changing the amount of sodium ions and lithium ions in the molten salt composition, and the temperature and the time of the ion exchange treatment, as shown in Table 4.

TABLE 4

| | Molten salt composition | | | |
|---|---|---|---|---|
| Glass material | $NaNO_3$ content (wt %) | $LiNO_3$ content (wt %) | Temperature (° C.) | Time (min) |
| Glass A | 100, 99, 97 | 0, 1, 3 | 420 | 480 |
| | 94 | 6 | 420 | 420 |
| Glass B | 100, 99, 98 | 0, 1, 2 | 410 | 480 |
| Glass C | 100, 99, 97 | 0, 1, 3 | 420 | 220 |

As shown in FIG. 5, the glass C is a glass material that has a small CTave value and therefore a small $CS_{90}$ value. In contrast, the glass A is a glass material that can have a CTave larger than that of the glass C by the ion exchange treatment. Therefore, it can be seen that, in the chemically strengthened glass production method of the present embodiment, when the surface compressive stress is reduced and the internal tensile stress is reduced particularly in a glass material such as the glass A that can have a large CTave by the ion exchange treatment, the deep layer compressive stress can be further increased.

Test Example 4

Figure 6A:
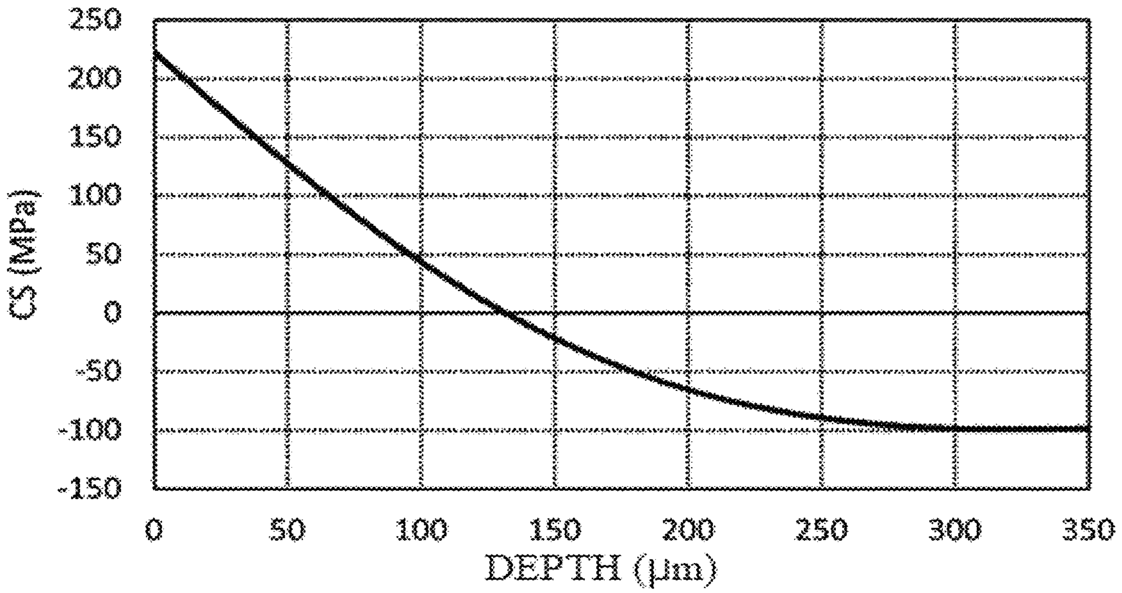
FIG. 6A and FIG. 6B are each a diagram showing a stress profile of a chemically strengthened glass.
Figure 6B:
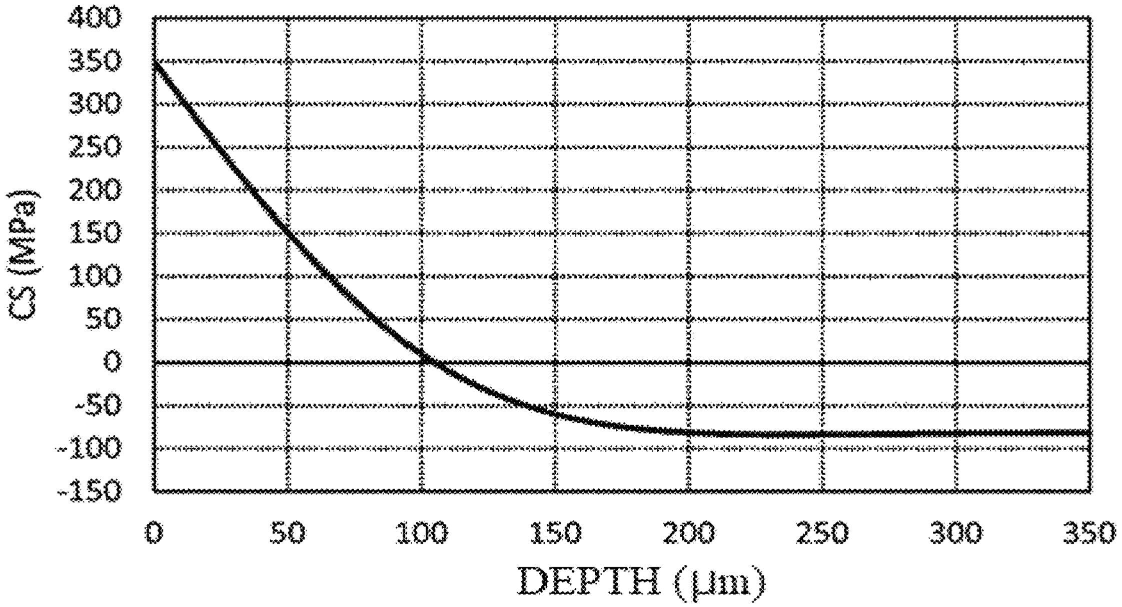

A glass sheet made of the glass A was prepared in the same manner as in Test Example 1, and the glass sheet was subjected to ion exchange under the conditions shown in Table 5 to obtain a chemically strengthened glass. Table 5 shows the results of evaluating the glass sheet and the chemically strengthened glass. In Table 5, Examples 1 to 7 are Inventive Examples, and Examples 8 to 10 are Comparative Examples. A blank (horizontal line) indicates no evaluation. In addition, the stress profile of Example 1 is shown in FIG. 6A, and the stress profile of Example 8 is shown in FIG. 6B.

In Table 5, each notation represents the following.

$Na_2O$ at center: $Na_2O$ concentration (%) at depth of sheet thickness center in mole percentage in terms of oxide $Na_2O$ at 30 m/$Na_2O$ at 90 μm: value obtained by dividing $Na_2O$ concentration (%) at depth of 30 μm from surface by $Na_2O$ concentration (%) at depth of 90 μm from surface, in mole percentage in terms of oxide $Na_2O$ at 50 μm/$Na_2O$ at center: value obtained by dividing $Na_2O$ concentration (%) at depth of 50 μm from surface by $Na_2O$ concentration (%) at depth of sheet thickness center, in mole percentage in terms of oxide FSM-$CS_0$: compressive stress value (MPa) on glass surface as measured with FSM $CS_{30}$: compressive stress value (MPa) at depth of 30 μm from glass surface $CS_{50}$: compressive stress value (MPa) at depth of 50 μm from glass surface $CS_{30\text{-}50}$: integrated value (Pa·m) of compressive stress CS at depth of 30 μm to 50 μm from surface $CS_{90}$: compressive stress value (MPa) at depth of 90 μm from glass surface DOC: compressive stress layer depth (μm)

$$CTave = ICT/LCT$$

ICT: tensile stress integrated value (Pa·m)

LCT: sheet thickness direction length (μm) of tensile stress region $K_1c$: fracture toughness value (MPa·$m^{1/2}$)

DOL-tail: surface layer compressive stress layer depth (μm)

$CS_x$": second-order differential value of compressive stress value as measured with SLP

TABLE 5

| | | | | 1 | 2 | 3 | 4 | 5 | 6 |
|---|---|---|---|---|---|---|---|---|---|
| | Glass material | | | Glass A | Glass A | Glass A | Glass A | Glass B | Glass B |
| | Thickness | | mm | 0.7 | 0.7 | 0.7 | 0.6 | 0.7 | 0.7 |
| | CTA | | | 73.5 | 73.5 | 73.5 | 75.7 | 68.2 | 68.2 |
| First ion exchange treatment | First molten salt composition | $KNO_3$ | mass % | 0 | 0 | 0 | 0 | 0 | 0 |
| | | $NaNO_3$ | mass % | 92 | 94 | 99 | 95 | 98.5 | 98.5 |
| | | $LiNO_3$ | mass % | 8 | 6 | 1 | 5 | 1.5 | 1.5 |
| | Contact temperature | | ° C. | 420 | 420 | 420 | 420 | 410 | 410 |
| | Contact time | | min | 420 | 420 | 480 | 660 | 480 | 480 |
| | CTave | | MPa | 70.25 | 73.9 | 98.1 | 81.2 | 68 | 68 |
| Second ion exchange treatment | Second molten salt composition | $KNO_3$ | mass % | 100 | 99.3 | 98 | 100 | 100 | 99.3 |
| | | $NaNO_3$ | mass % | 0 | 0.6 | 0 | 0 | 0 | 0.6 |
| | | $LiNO_3$ | mass % | 0 | 0.1 | 2 | 0 | 0 | 0.1 |
| | Contact temperature | | ° C. | 420 | 420 | 420 | 420 | 390 | 390 |
| | Contact time | | min | 30 | 90 | 60 | 90 | 90 | 90 |
| | CTave | | MPa | 72.91 | 73.2 | 76.72 | 74 | 67.5 | 64.21 |
| Third ion exchange treatment | Third molten salt composition | $KNO_3$ | mass % | — | — | 100 | — | — | — |
| | | $NaNO_3$ | mass % | — | — | 0 | — | — | — |
| | | $LiNO_3$ | mass % | — | — | 0 | — | — | — |
| | Contact temperature | | ° C. | — | — | 390 | — | — | — |
| | Contact time | | min | — | — | 10 | — | — | — |
| | CTave | | Mpa | — | — | 73 | — | — | — |
| $Na_2O$ | $Na_2O$ at center | | mol % | 1.6 | 1.6 | 1.6 | 1.6 | 5.6 | 5.6 |
| | $Na_2O$ at 30 μm | | mol % | 5.20 | — | — | — | — | — |
| | $Na_2O$ at 50 μm | | mol % | 4.80 | — | — | — | — | — |
| | $Na_2O$ at 90 μm | | mol % | 3.90 | — | — | — | — | — |
| | $Na_2O$ at 30 μm/ $Na_2O$ at 90 μm | | — | 1.30 | — | — | — | — | — |
| | $Na_2O$ at 50 μm/ $Na_2O$ at center | | — | 3.00 | — | — | — | — | — |
| | $Na_2O$ at 90 μm/ $Na_2O$ at center | | — | 2.44 | — | — | — | — | — |
| Stress | $CS_0$ | | MPa | 1146 | 815 | 1046 | 1059 | 1183 | 893 |
| | $CS_{30\text{-}50}$ | | Pa · m | 5982 | 5554 | 4492 | 4690 | 5693 | 5092 |
| | $CS_{50}$ | | MPa | 127 | 123 | 110 | 101 | 122 | 111 |
| | $CS_{90}$ | | MPa | 59 | 69 | 89 | 47 | 60 | 61 |
| | DOC | | μm | 132 | 144 | 160 | 126 | 138 | 144 |
| | DOL-tail | | μm | 3.3 | 3.9 | 2.8 | 5.6 | 3.5 | 3.1 |
| | $CS_x$" maximum value | | | 0.00856 | 0.005216 | 0.005096 | 0.003552 | 0.007264 | 0.00496 |
| | $CS_x$" minimum value | | | 7.2E–05 | –0.00174 | –0.0243 | –0.00035 | 7.2E–05 | –8E–06 |
| Surface resistivity | | | logΩ · cm | 9.2 | 9.1 | 9.0 | 9.6 | 9.2 | 9.0 |
| 4PB strength | | | MPa | 1350 | 1007 | 1296 | 1171 | 1370 | 1122 |
| #80 Sandpaper average set drop strength | | | cm | 46 | 49 | 54 | 43 | 46 | 47 |

TABLE 5-continued

| | | | | 7 | 8 | 9 | 10 | 11 |
|---|---|---|---|---|---|---|---|---|
| | Glass material | | | Glass B | Glass A | Glass A | Glass B | Glass B |
| | Thickness | | mm | 0.55 | 0.7 | 0.7 | 0.7 | 0.7 |
| | CTA | | | 73.2 | 73.5 | 73.5 | 68.2 | 68.2 |
| First ion exchange treatment | First molten salt composition | $KNO_3$ | mass % | 0 | 60 | 60 | 60 | 0 |
| | | $NaNO_3$ | mass % | 99.4 | 40 | 40 | 40 | 100 |
| | | $LiNO_3$ | mass % | 0.6 | 0 | 0 | 0 | 0 |
| | Contact temperature | | ° C. | 410 | 420 | 420 | 410 | 410 |
| | Contact time | | min | 360 | 125 | 125 | 140 | 120 |
| | CTave | | MPa | 77.8 | 69.39 | 69.39 | 60.57 | 60.57 |
| Second ion exchange treatment | Second molten salt composition | $KNO_3$ | mass % | 99 | 99.4 | 99.3 | 100 | 99 |
| | | $NaNO_3$ | mass % | 1 | 0.6 | 0.6 | 0 | 1 |
| | | $LiNO_3$ | mass % | 0 | 0 | 0.1 | 0 | 0 |
| | Contact temperature | | ° C. | 390 | 390 | 390 | 390 | 440 |
| | Contact time | | min | 75 | 50 | 40 | 75 | 60 |
| | CTave | | MPa | 72.8 | 71.33 | 67.97 | 60.88 | 57.69 |
| Third ion exchange treatment | Third molten salt composition | $KNO_3$ | mass % | — | — | — | — | — |
| | | $NaNO_3$ | mass % | — | — | — | — | — |
| | | $LiNO_3$ | mass % | — | — | — | — | — |
| | Contact temperature | | ° C. | — | — | — | — | — |
| | Contact time | | min | — | — | — | — | — |
| | CTave | | MPa | — | — | — | — | — |
| $Na_2O$ | $Na_2O$ at center | | mol % | 5.6 | 1.6 | 1.6 | 5.6 | 5.6 |
| | $Na_2O$ at 30 μm | | mol % | — | — | — | — | 8.83 |
| | $Na_2O$ at 50 μm | | mol % | — | — | — | — | 8.37 |
| | $Na_2O$ at 90 μm | | mol % | — | — | — | — | 6.5 |
| | $Na_2O$ at 30 μm/$Na_2O$ at 90 μm | | — | — | — | — | — | 1.36 |
| | $Na_2O$ at 50 μm/$Na_2O$ at center | | — | — | — | — | — | 1.49 |
| | $Na_2O$ at 90 μm/$Na_2O$ at center | | — | — | — | — | — | 1.16 |
| Stress | $CS_0$ | | MPa | 1043 | 1037 | 847 | 1218 | 900 |
| | $CS_{30-50}$ | | Pa · m | 5543 | 7698 | 7515 | 5808 | 4800 |
| | $CS_{50}$ | | MPa | 112 | 151 | 150 | 112 | 112 |
| | $CS_{90}$ | | MPa | 32 | 32 | 38 | 31 | 31 |
| | DOC | | μm | 109 | 105 | 109 | 111 | 111 |
| | DOL-tail | | μm | 3.3 | 3.4 | 3.4 | 3.6 | 6.2 |
| | $CS_x''$ maximum value | | | 0.01294 | 0.030664 | 0.026456 | 0.0774 | 0.099 |
| | $CS_x''$ minimum value | | | 0.00018 | 0.000456 | 0.000384 | 0.002856 | 0.0043 |
| | Surface resistivity | | logΩ · cm | 9.1 | 10.6 | 10.7 | 11.0 | 11.3 |
| | 4PB strength | | MPa | 1252 | 1239 | 1060 | 1396 | 1022 |
| | #80 Sandpaper average set drop strength | | cm | 39 | 39 | 41 | 39 | 39 |

As can be seen from Table 5, when Examples 1 to 4 as Inventive Examples are compared with Examples 8 and 9 as Comparative Examples, and Examples 5 and 6 as Inventive Examples are compared with Examples 10 and 11 as Comparative Examples, the $CS_{90}$, which contributes to the #80 set drop strength, is larger, and the set drop strength is improved. Examples 1 to 4 as Inventive Examples have bending strength higher than that of Examples 8 and 9 as Comparative Examples, and Examples 5 to 7 as Inventive Examples have bending strength higher than that of Examples 10 and 11 as Comparative Examples. In addition, Examples 1 to 7 as Inventive Examples have a surface resistivity lower than that of Examples 8 to 11 as Comparative Examples, which is 10 log Ω/sq or less.

The present invention has been described in detail with reference to a specific mode, but it will be apparent to those skilled in the art that various changes and modifications can be made without departing from the spirit and scope of the present invention.

The present application is based on Japanese Patent Application No. 2023-083281 filed on May 19, 2023, and the entirety of which is incorporated herein by reference.

What is claimed is:

1. A chemically strengthened glass having a sheet thickness t (mm), a compressive stress layer depth DOC of 180×t (μm) or more, $CS_{30-50}$ which is a compressive stress integrated value at a depth of 30 μm to 50 μm from a surface of the chemically strengthened glass of 6000 Pa·m or less, and $CS_{90}$ which is a compressive stress value at a depth of 90 μm from the surface of 175×t−88 (MPa) or more, wherein the chemically strengthened glass has undergone a chemical strengthening comprising a first ion exchange treatment and a second ion exchange treatment.

2. The chemically strengthened glass according to claim 1, having a Young's modulus of 80 GPa or more.

3. The chemically strengthened glass according to claim 1, wherein in a profile of $CS_x$ [MPa] which is a stress value at a depth of x [μm] from the surface of the chemically strengthened glass as measured with a scattered light photoelastic stress meter, a second-order differential value $CS_x''$ of the stress value $CS_x$ satisfies the following expression in a range of $CS_x \geq 0$:

$$-0.03 \leq CS_x'' \leq 0.013.$$

4. The chemically strengthened glass according to claim 1, having a surface compressive stress value FSM-$CS_0$ of 800 MPa or more.

5. The chemically strengthened glass according to claim 1, having a base composition comprising, in mol % in terms of oxide:

55% to 75% of $SiO_2$;

3% to 15% of $Li_2O$; and

8% to 25% of $Al_2O_3$.

6. The chemically strengthened glass according to claim 1, comprising, in mol % in terms of oxide:

55% to 75% of $SiO_2$;

8% to 25% of $Al_2O_3$;

3% to 15% of $Li_2O$;

1% to 5% of $Na_2O$;

0% to 3% of $K_2O$;

0% to 10% of MgO;

0% to 10% of CaO;

0% to 5% of SrO;

0% to 5% of ZnO;

0% to 3% of $TiO_2$;

0% to 3% of $ZrO_2$;

0% to 1% of $SnO_2$;

greater than 0% to 1% of $P_2O_5$;

greater than 0% to 10% of $B_2O_3$;

0% to 3% of $Y_2O_3$; and

0% to 0.1% of $Fe_2O_3$, wherein $Li_2O/[Li_2O+Na_2O+K_2O]$, which is a ratio of a content of $Li_2O$ to a total content of $Li_2O$, $Na_2O$, and $K_2O$, is 0.5 to 0.9, $Li_2O/Na_2O$, which is a ratio of the content of $Li_2O$ to a content of $Na_2O$, is 1.5 to 10, and a Young's modulus is 80 GPa or more.

7. The chemically strengthened glass according to claim 6, wherein $B_2O_3/P_2O_5$, which is a ratio of a content of $B_2O_3$ to a content of $P_2O_5$, is 2.5 to 500.

8. The chemically strengthened glass according to claim 6, wherein in a case where a compressive stress layer is formed by an ion exchange treatment at 380° C. for 4 hours by using a molten salt comprising sodium nitrate, $CS_{30}$ which is a compressive stress value at a depth of 30 μm from a surface of the compressive stress layer is 150 MPa or more.

9. The chemically strengthened glass according to claim 3, having a surface compressive stress value FSM-$CS_0$ of 800 MPa or more.

* * * * *